US011126187B2

(12) United States Patent
McGill, Jr. et al.

(10) Patent No.: US 11,126,187 B2
(45) Date of Patent: Sep. 21, 2021

(54) SYSTEMS AND METHODS FOR CONTROLLING THE OPERATION OF A VEHICLE

(71) Applicant: Toyota Research Institute, Inc., Los Altos, CA (US)

(72) Inventors: Stephen G. McGill, Jr., Broomall, PA (US); Guy Rosman, Newton, MA (US); John Joseph Leonard, Newton, MA (US); Luke S. Fletcher, Cambridge, MA (US); Yusuke Sawamura, Ann Arbor, MI (US); Xin Huang, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 105 days.

(21) Appl. No.: 16/295,353

(22) Filed: Mar. 7, 2019

(65) Prior Publication Data
US 2020/0089246 A1    Mar. 19, 2020

Related U.S. Application Data

(60) Provisional application No. 62/731,895, filed on Sep. 15, 2018.

(51) Int. Cl.
*G05D 1/02* (2020.01)
*G05D 1/00* (2006.01)
(Continued)

(52) U.S. Cl.
CPC ........... *G05D 1/0214* (2013.01); *B60W 30/09* (2013.01); *B60W 30/0953* (2013.01);
(Continued)

(58) Field of Classification Search
CPC .. G05D 1/0214; G05D 1/0221; G05D 1/0231; G05D 1/0255; G05D 1/0257;
(Continued)

(56) References Cited

U.S. PATENT DOCUMENTS

| 2009/0076702 | A1* | 3/2009 | Arbitmann | ......... | B62D 15/0265 |
| | | | | | 701/96 |
| 2010/0063735 | A1* | 3/2010 | Kindo | ................. | B60W 40/072 |
| | | | | | 701/300 |

(Continued)

OTHER PUBLICATIONS

Phillips et al., "Generalizable Intention Prediction of Human Drivers at Intersections," 2017 IEEE Intelligent Vehicles Symposium (IV), Jun. 11-14, 2017, (found at http://timallanwheeler.com/aboutme/papers/phillips2017intention.pdf).

(Continued)

*Primary Examiner* — Jason Holloway
(74) *Attorney, Agent, or Firm* — Christopher G. Darrow; Darrow Mustafa PC

(57) ABSTRACT

Systems and methods described herein relate to controlling the operation of a vehicle. One embodiment generates predicted trajectories of the vehicle using first trajectory predictors based, at least in part, on first inputs; generates predicted trajectories of a road agent that is external to the vehicle using second trajectory predictors based, at least in part, on second inputs; integrates the predicted trajectories of the road agent into the first inputs to iteratively update the predicted trajectories of the vehicle and integrates the predicted trajectories of the vehicle into the second inputs to iteratively update the predicted trajectories of the road agent; and controls operation of the vehicle based, at least in part, on at least one of (1) the iteratively updated predicted trajectories of the vehicle and (2) the iteratively updated predicted trajectories of the road agent.

20 Claims, 15 Drawing Sheets

(51) Int. Cl.

| | | |
|---|---|---|
| *G05B 13/02* | (2006.01) | |
| *G06N 3/04* | (2006.01) | |
| *B60W 30/09* | (2012.01) | |
| *B60W 30/095* | (2012.01) | |
| *G06N 3/08* | (2006.01) | |
| *G06N 5/04* | (2006.01) | |

(52) U.S. Cl.
CPC ......... *G05B 13/027* (2013.01); *G05D 1/0088* (2013.01); *G05D 1/027* (2013.01); *G05D 1/0221* (2013.01); *G05D 1/0231* (2013.01); *G05D 1/0255* (2013.01); *G05D 1/0257* (2013.01); *G06N 3/0454* (2013.01); *G06N 3/08* (2013.01); *G06N 5/046* (2013.01); *B60W 30/0956* (2013.01); *B60W 2554/00* (2020.02); *G05D 2201/0213* (2013.01)

(58) Field of Classification Search
CPC .................. G05D 1/027; G05D 1/0088; G05D 2201/0213; B60W 30/09; B60W 30/0953; B60W 2554/00; B60W 30/0956; B60W 2256/20; B60W 2050/0014; B60W 60/0016; G06N 3/08; G06N 5/046; G06N 3/0454; G06N 7/005; G06N 3/0472; G05B 13/027
See application file for complete search history.

(56) References Cited

U.S. PATENT DOCUMENTS

| | | | | |
|---|---|---|---|---|
| 2010/0207762 | A1* | 8/2010 | Lee ..................... | G06K 9/00771 340/541 |
| 2010/0228427 | A1* | 9/2010 | Anderson .............. | G08G 1/166 701/31.4 |
| 2011/0246156 | A1* | 10/2011 | Zecha ................ | G06K 9/00342 703/6 |
| 2018/0120859 | A1 | 5/2018 | Eagelberg et al. | |
| 2019/0308620 | A1* | 10/2019 | Sapp .................... | G05D 1/0221 |

OTHER PUBLICATIONS

Schlechtriemen et al., "A Probabilistic Long Term Prediction Approach for Highway Scenarios," 2014 IEEE 17th International Conference on Intelligent Transportation Systems (ITSC) Oct. 8-11, 2014.
Pan, "Learning Control via Probabilistic Trajectory Optimization," Doctoral Dissertation, Georgia Institute of Technology, Dec. 2017 (found at https://smartech.gatech.edu/bitstream/handle/1853/59278/pan-dissertation-2017.pdf?sequence=1&isAllowed=y).
Fragkiadaki et al., "Motion Prediction Under Multimodality with Conditional Stochastic Networks," 2017 (found at https://arxiv.org/pdf/1705.02082.pdf).
Lefèvre et al., "Evaluating Risk at Road Intersections by Detecting Conflicting Intentions," Research Report RR-7904, INRIA, 2012 (found at https://hal.inria.fr/file/index/docid/678482/filename/RR-7904.pdf).
Spica, et al., "A Real-Time Game Theoretic Planner for Autonomous Two-Player Drone Racing", Jan. 26, 2018, (available at: arXiv:1801.02302v2 [cs.RO] Jan. 26, 2018).
Cui, et al., "Multimodal Trajectory Predictions for Autonomous Driving using Deep Convolutional Networks", Sep. 18, 2018, (available at: arXiv:1809.10732v1 [cs.RO] Sep. 18, 2018).
U.S. Appl. No. 16/295,335, filed Mar. 7, 2019.
U.S. Appl. No. 16/295,343, filed Mar. 7, 2019.
Houenou et al., "Vehicle trajectory prediction based on motion model and maneuver recognition," in Intelligent Robots and Systems (IROS), 2013 IEEE/RSJ International Conference, pp. 4363-4369.
Woo et al., "Lane-change detection based on vehicle-trajectory prediction," IEEE Robotics and Automation Letters, vol. 2, No. 2, pp. 1109-1116, Apr. 2017.
Kendall et al., "What uncertainties do we need in bayesian deep learning for computer vision?" Advances in neural information processing systems, pp. 5574-5584, 2017.
Vasquez et al., "Growing hidden markov models: An incremental tool for learning and predicting human and vehicle motion," The International Journal of Robotics Research, vol. 28, No. 11-12, pp. 1486-1506, 2009.
Wiest et al., "Probabilistic trajectory prediction with gaussian mixture models," in Intelligent Vehicles Symposium (IV), IEEE, pp. 141-146, 2012.
Hermes et al., "Long-term vehicle motion prediction," in Intelligent Vehicles Symposium, IEEE, 2009, pp. 652-657.
Park et al., "Sequence-to-sequence prediction of vehicle trajectory via lstm encoder-decoder architecture," 2018 IEEE Intelligent Vehicles Symposium (IV), Changshu, pp. 1672-1678.
Deo et al., "Multi-modal trajectory prediction of surrounding vehicles with maneuver based lstms," 2018 IEEE Intelligent Vehicles Symposium (IV), Changshu, pp. 1179-1184.
Eun-Ha Choi, "Crash factors in intersection-related crashes: An on-scene perspective," US DOT National Highway Traffic Safety Administration, 2010.
Berthelot et al., "Handling uncertainties in criticality assessment," 2011 IEEE Intelligent Vehicles Symposium (IV), Baden-Baden, pp. 571-576.
Perez et al., "Vehicle control in ADAS applications: State of the art," Intelligent Transport Systems: Technologies and Applications, pp. 206-219, 2015.
Schwarting et al., "Parallel autonomy in automated vehicles: Safe motion generation with minimal intervention," 2017 IEEE International Conference on Robotics and Automation (ICRA), Singapore, pp. 1928-1935.
Naser et al., "A parallel autonomy research platform," 2017 IEEE Intelligent Vehicles Symposium (IV), Los Angeles, CA, pp. 933-940.
Lefevre et al., "A survey on motion prediction and risk assessment for intelligent vehicles," Robomech Journal, vol. 1, No. 1, pp. 1-14, 2014.
Schreier et al., "An integrated approach to maneuver-based trajectory prediction and criticality assessment in arbitrary road environments," IEEE Transactions on Intelligent Transportation Systems, vol. 17, No. 10, pp. 2751-2766, 2016.
Tran et al., "Online maneuver recognition and multimodal trajectory prediction for intersection assistance using non-parametric regression," Intelligent Vehicles Symposium Proceedings, IEEE, 2014, pp. 918-923.
Kim et al., "Probabilistic vehicle trajectory prediction over occupancy grid map via recurrent neural network," 2017 IEEE 20th International Conference on Intelligent Transportation Systems (ITSC), Yokohama, pp. 399-404.
Lee et al., "Desire: Distant future prediction in dynamic scenes with interacting agents," Proceedings of the IEEE Conference on Computer Vision and Pattern Recognition, 2017, pp. 336-345.
Alahi et al., "Social LSTM: Human trajectory prediction in crowded spaces," Proceedings of the IEEE Conference on Computer Vision and Pattern Recognition, 2016, pp. 961-971.
Richter et al., "Safe visual navigation via deep learning and novelty detection," Robotics: Science and Systems XIII, pp. 1-9, 2017.
Amini et al., "Variational autoencoder for end-to-end control of autonomous driving with novelty detection and training debiasing," 2018 IEEE/RSJ International Conference on Intelligent Robots and Systems (IROS), Madrid, pp. 568-575.
Ramanagopal et al., "Failing to learn: Autonomously identifying perception failures for self-driving cars," IEEE Robotics and Automation Letters, vol. 3, No. 4, pp. 3860-3867, 2018.
Deo et al., "How would surround vehicles move? a unified framework for maneuver classification and motion prediction," IEEE Transactions on Intelligent Vehicles, vol. 3, No. 2, pp. 129-140, 2018.

(56) References Cited

OTHER PUBLICATIONS

Havlak et al., "Discrete and continuous, probabilistic anticipation for autonomous robots in urban environments," IEEE Transactions on Robotics, vol. 30, No. 2, pp. 461-474, 2014.
Simonyan et al., "Very deep convolutional networks for large-scale image recognition," ICLR 2015, pp. 1-14.
McGill Jr et al., "Systems and Methods for Predicting Vehicle Trajectory", Non-Final Office Action received for co-pending U.S. Appl. No. 16/295,335, dated Jan. 4, 2021 (34 pages).
McGill Jr. et al., "Systems and Methods for Predicting the Trajectory of a Road Agent External to a Vehicle", Non-Final Office Action received for co-pending U.S. Appl. No. 16/295,343, dated Jan. 4, 2021 (29 pages).

* cited by examiner

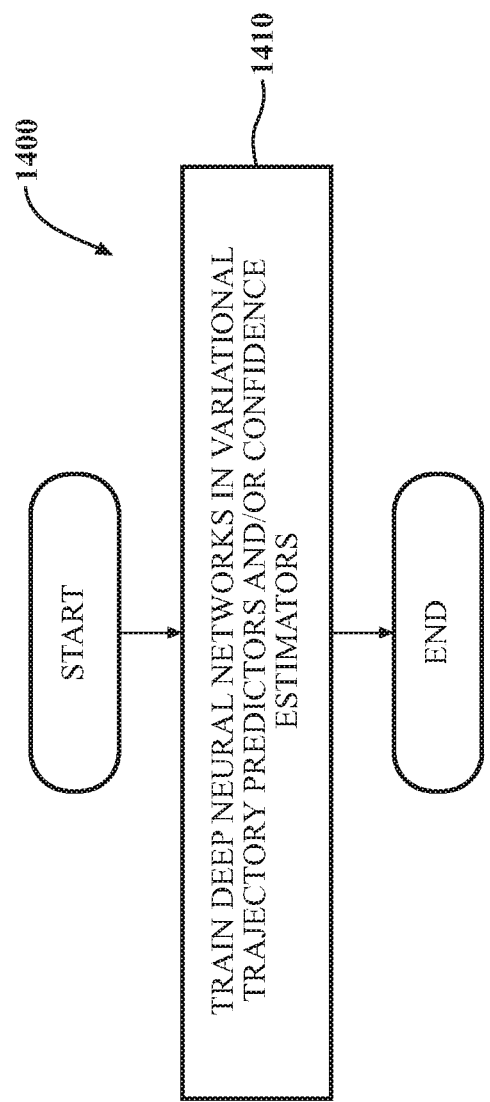

SYSTEMS AND METHODS FOR CONTROLLING THE OPERATION OF A VEHICLE

CROSS-REFERENCE TO RELATED APPLICATION

This application claims the benefit of U.S. Provisional Patent Application No. 62/731,895, "Uncertainty-Aware Driver Trajectory Prediction at Urban Intersections," filed Sep. 15, 2018, which is incorporated by reference herein in its entirety.

TECHNICAL FIELD

The subject matter described herein relates in general to vehicles and, more specifically, to systems and methods for controlling the operation of a vehicle.

BACKGROUND

In some applications, systems may predict the trajectory of a vehicle (sometimes referred to herein as the "ego vehicle"). For example, a parallel-autonomy vehicle, such as a vehicle that includes an advanced driver-assistance system (ADAS), is a vehicle whose control is shared between a human driver and an autonomous-driving system. The human driver may retain control of certain aspects of driving such a vehicle (e.g., steering) while the ADAS monitors the driver's actions and, when necessary, intervenes to prevent an accident. Predicting the trajectory of the vehicle (sometimes termed the "ego vehicle") is thus an important aspect of such an ADAS.

In other applications, a vehicular system may predict the trajectory of a road agent external to a vehicle. Examples of road agents include various types of other vehicles (e.g., automobiles, motorcycles, or bicycles) and pedestrians. One objective for an autonomous vehicle or a parallel-autonomy vehicle is to travel a route without colliding with the road agents the vehicle encounters along the way. Since the intentions of road agents or their drivers are not usually known with certainty to an autonomous vehicle or the driver of a parallel-autonomy vehicle, predicting the trajectory of a road agent can further that objective.

In the applications mentioned above, current trajectory prediction systems fail to account adequately for the uncertain nature of human actions and for the interactions that occur between an ego vehicle and the road agents it encounters.

SUMMARY

An example of a system for controlling the operation of a vehicle is presented herein. The system comprises one or more processors and a memory communicably coupled to the one or more processors. The memory stores a trajectory-prediction module including instructions that when executed by the one or more processors cause the one or more processors to generate predicted trajectories of the vehicle using first trajectory predictors based, at least in part, on first inputs including at least past trajectory information for the vehicle and sensor data. The trajectory-prediction module also generates predicted trajectories of a road agent that is external to the vehicle using second trajectory predictors based, at least in part, on second inputs including at least past trajectory information for the road agent and the sensor data. The trajectory-prediction module also integrates the predicted trajectories of the road agent into the first inputs to iteratively update the predicted trajectories of the vehicle and integrates the predicted trajectories of the vehicle into the second inputs to iteratively update the predicted trajectories of the road agent. The memory also stores a control module including instructions that when executed by the one or more processors cause the one or more processors to control operation of the vehicle based, at least in part, on at least one of the iteratively updated predicted trajectories of the vehicle and the iteratively updated predicted trajectories of the road agent.

Another embodiment is a non-transitory computer-readable medium for controlling the operation of a vehicle and storing instructions that when executed by one or more processors cause the one or more processors to generate predicted trajectories of the vehicle using first trajectory predictors based, at least in part, on first inputs including at least past trajectory information for the vehicle and sensor data. The instructions also cause the one or more processors to generate predicted trajectories of a road agent that is external to the vehicle using second trajectory predictors based, at least in part, on second inputs including at least past trajectory information for the road agent and the sensor data. The instructions also cause the one or more processors to integrate the predicted trajectories of the road agent into the first inputs to iteratively update the predicted trajectories of the vehicle and to integrate the predicted trajectories of the vehicle into the second inputs to iteratively update the predicted trajectories of the road agent. The instructions also cause the one or more processors to control the operation of the vehicle based, at least in part, on at least one of the iteratively updated predicted trajectories of the vehicle and the iteratively updated predicted trajectories of the road agent.

Another embodiment is a method of controlling the operation of a vehicle, comprising generating predicted trajectories of the vehicle using first trajectory predictors based, at least in part, on first inputs including at least past trajectory information for the vehicle and sensor data. The method also includes generating predicted trajectories of a road agent that is external to the vehicle using second trajectory predictors based, at least in part, on second inputs including at least past trajectory information for the road agent and the sensor data. The method also includes integrating the predicted trajectories of the road agent into the first inputs to iteratively update the predicted trajectories of the vehicle and integrating the predicted trajectories of the vehicle into the second inputs to iteratively update the predicted trajectories of the road agent. The method also includes controlling operation of the vehicle based, at least in part, on at least one of the iteratively updated predicted trajectories of the vehicle and the iteratively updated predicted trajectories of the road agent.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented

FIG. 14 is a flowchart of a method of training the deep neural networks in one or more variational trajectory predictors and confidence estimators, in accordance with an illustrative embodiment of the invention.

DETAILED DESCRIPTION

Figure 1:
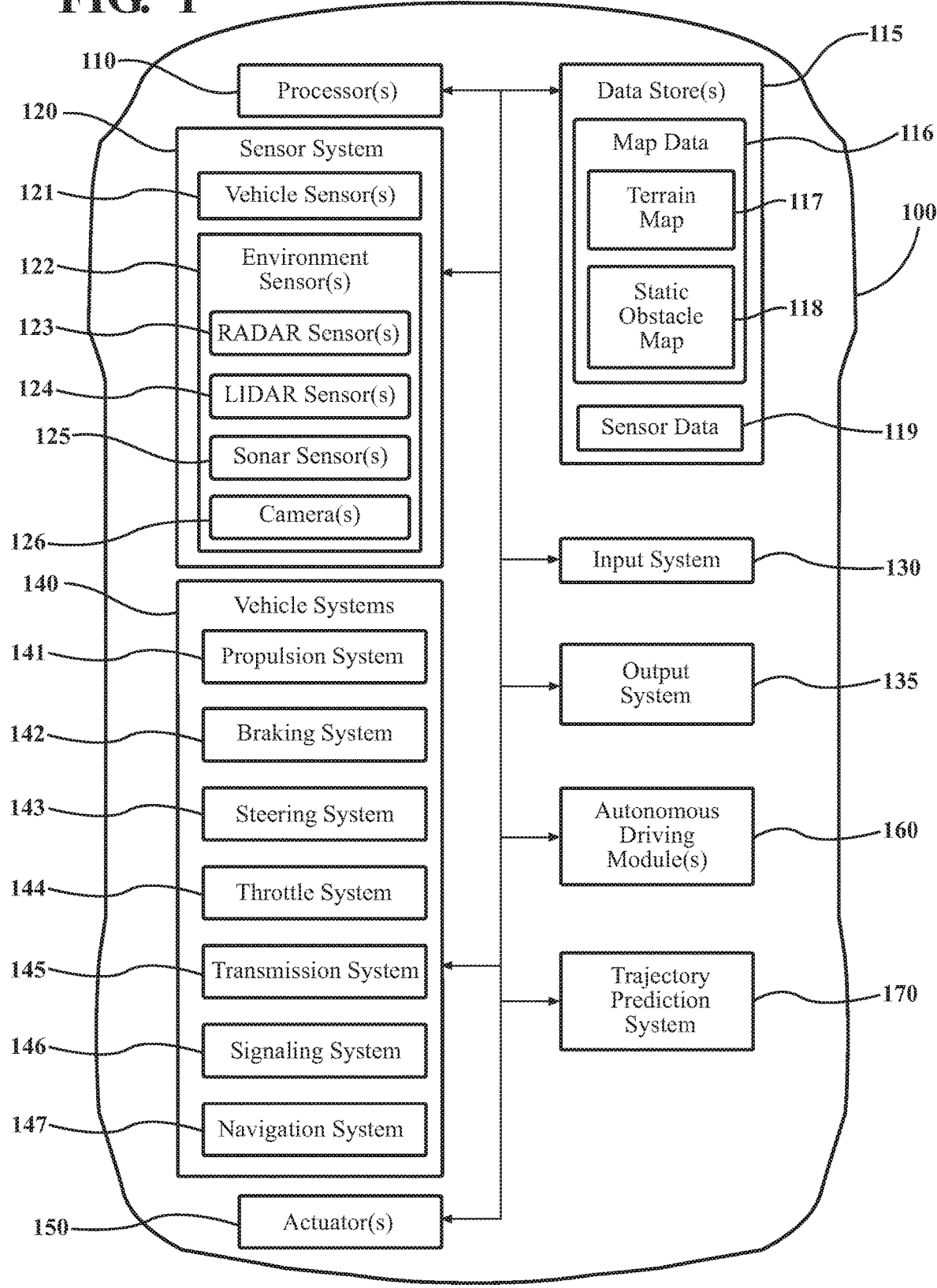
FIG. 1 illustrates one embodiment of a vehicle within which systems and methods disclosed herein may be implemented.

The embodiments described herein address important weaknesses in existing trajectory-prediction systems. Deterministic trajectory prediction algorithms can fail to adequately capture the uncertain nature of human actions, particularly the actions of a human driver (e.g., the driver of an ego vehicle or the driver of a road agent external to the ego vehicle). Data-driven approaches to trajectory prediction can learn common characteristics from datasets containing demonstrated trajectories, but those methods may not perform well in scenarios in which an ego vehicle or external road agent can traverse any of several possible trajectories (e.g., turn left, turn right, or proceed straight at an intersection). Existing trajectory-prediction systems can also fail to account for the dynamic interactions that occur between an ego vehicle and the road agents it encounters (e.g., negotiating right of way at an uncontrolled intersection).

In this description, the term "road agent" refers generally to any object that is capable of moving from place to place along or in a manner that intersects with a roadway. Such objects are not always necessarily in motion, however. For example, various embodiments described herein consider an automobile parked along a street to be a road agent. In those embodiments, the system tracks the parked automobile, along with other detected objects in the environment, using the vehicle's sensors. The sensor data would reveal that the road agent (the parked automobile) is stationary—that there is no trajectory associated with it that can be predicted at that time. However, in those various embodiments, the system might continue to track the parked automobile because it could begin moving at any time. In various embodiments, the road agents of interest are external to a vehicle (sometimes referred to herein as the "ego vehicle" or "host vehicle") in which an embodiment of the invention is operating. Such road agents are sometimes referred to herein as "external road agents." Some examples of road agents include, without limitation, other vehicles of various types (automobiles, motorcycles, bicycles, trucks, construction equipment, etc.), pedestrians, and animals.

The embodiments described herein pertain to both ego-vehicle trajectory prediction and road-agent trajectory prediction and, in particular, to how those trajectory predictions can iteratively interact with one another. These embodiments feed predicted ego-vehicle trajectories as inputs to road-agent trajectory predictors and feeding predicted road-agent trajectories as inputs to ego-vehicle trajectory predictors to iteratively update both ego-vehicle and road-agent trajectory predictions. This technique more effectively accounts for the interactions that occur between an ego vehicle and the external road agents it encounters. In some embodiments, if the ego vehicle is operating in a fully autonomous driving mode, the ego-vehicle's known (deterministic) trajectory can be fed as an input to the road-agent trajectory predictors to reduce the complexity of predicting road-agent trajectories.

A number of variations in the architecture just described are possible, depending on the particular embodiment. In some embodiments, probabilistic variational trajectory predictors are used to predict the ego-vehicle and/or road-agent trajectories. In those embodiments, the trajectory probability distributions for the ego-vehicle or a given road-agent, whichever applies, can be sampled to generate one or more specific predicted trajectories. Those predicted trajectories can be cross-fed and iteratively updated between the ego vehicle and one or more road agents, as described above, and they can also be output to a control module of the ego vehicle that controls, to at least some extent, the operation of the ego vehicle, as described further below. In some variational-predictor embodiments, the statistical parameters of the trajectory probability distributions are output to the control module of the ego vehicle instead of specific trajectories sampled from the distributions.

Depending on the particular embodiment, the ego-vehicle trajectory predictors can consider the predicted trajectories of multiple external road agents in any of a number of possible orderings. In one embodiment, the road-agent trajectory predictions are prioritized by their distance from the ego vehicle, those closer to the ego vehicle receiving a higher priority than those farther away. In another embodiment, the road-agent trajectory predictions are prioritized by the uncertainty associated with the road-agent trajectory predictions, those with less uncertainty (i.e., greater certainty) receiving a higher priority than those with greater uncertainty (i.e., lower certainty). Furthermore, intermediate trajectory predictions for the ego vehicle and/or one or more external road agents during the iterative trajectory prediction process can be preserved, collected, and aggregated, taking into account all possible orderings of the external road agents. Keeping all of these various hypotheses alive permits the ego vehicle's control module to consider all of the possible actions the road agents might take. This conservative approach furthers the objective of the ego vehicle planning and traversing a safe trajectory.

Other techniques can be combined advantageously with the iterative-trajectory-prediction architecture described above: (1) employing multiple trajectory predictors to predict the future trajectory of the ego vehicle and multiple trajectory predictors to predict the future trajectory of one or more road agents external to the ego vehicle; and (2) generating confidence estimates for the predicted ego-vehicle and road-agent trajectories so that their trustworthiness can be evaluated. These techniques are explained further in the paragraphs that follow.

To predict the future trajectory of the ego vehicle or a given external road agent, some embodiments described herein employ two or more trajectory predictors that use different deterministic or probabilistic computational models. For example, in one embodiment including two trajectory predictors, the first trajectory predictor is a probabilistic variational trajectory predictor that includes a DNN, and the second trajectory predictor is a physics-based (deterministic) model. In various embodiments, the trajectory predictors receive, as inputs, any of a variety of vehicle sensor data discussed further below. Depending on the particular embodiment, the trajectory predictors may also receive measured past trajectory information for the ego vehicle or road agent, depending on which type of trajectory is being predicted.

Regarding the confidence estimates, one important aspect of the disclosed embodiments is the temporal (time) horizon over which a vehicle or road-agent trajectory is predicted. For example, a given predicted trajectory from a particular trajectory predictor might be trustworthy over a relatively short temporal horizon of 0.1 to 3 seconds, but it might not be trustworthy over a longer temporal horizon extending beyond 3 seconds up to 10 seconds. In some embodiments, the confidence estimates for the ego-vehicle and road-agent trajectory predictions are computed as a continuous-time function over the applicable temporal horizon using a deep-neural-network (DNN) model. The confidence measures thus assist the trajectory prediction system in deciding which ego-vehicle or road-agent trajectory predictions are most trustworthy for particular segments of the overall temporal prediction horizon. In various embodiments, the confidence scores associated with the iteratively updated ego-vehicle and road-agent trajectory predictions are also iteratively updated as the trajectory predictions themselves are iteratively updated.

In various embodiments, the operation of the ego vehicle can be controlled based, at least in part, one at least one of (1) the iteratively updated predicted trajectories of the ego vehicle; and (2) the iteratively updated predicted trajectories of an external road agent. For example, in various embodiments, the trajectory prediction system can control the operation of the ego vehicle by planning a trajectory for the ego vehicle based, at least in part, on the kind of predicted-trajectory information listed above. In some embodiments, the planned trajectory is executed by the ego vehicle entirely autonomously, when the vehicle is operating in a fully autonomous driving mode. In other embodiments, the planned trajectory is executed by the system temporarily taking at least partial control, from a human driver, of certain vehicle functions such as steering and/or braking, if the system deems such intervention to be necessary to ensure that the vehicle traverses a safe trajectory (e.g., avoids collisions with road agents or other objects in the environment).

In general, the techniques described herein can be applied to at least the following use cases: (1) driving safely without colliding with road agents, when the vehicle is operating autonomously; and (2) gauging risk and determining an optimal trajectory, when the vehicle is operating in a parallel-autonomy mode (e.g., when a human driver is driving the vehicle with a driver-assistance system engaged).

Referring to FIG. 1, an example of a vehicle 100 (sometimes referred to herein as an "ego vehicle") is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-14 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes a trajectory prediction system 170 that is implemented to perform methods and other functions as disclosed herein relating to controlling the operation of vehicle 100 based, at least in part, on predicted future trajectories of vehicle 100 itself and predicted trajectories of one or more road agents external to vehicle 100. In some embodiments, the trajectory of vehicle 100 or a road agent can be modeled in three-dimensional space.

Figure 2:
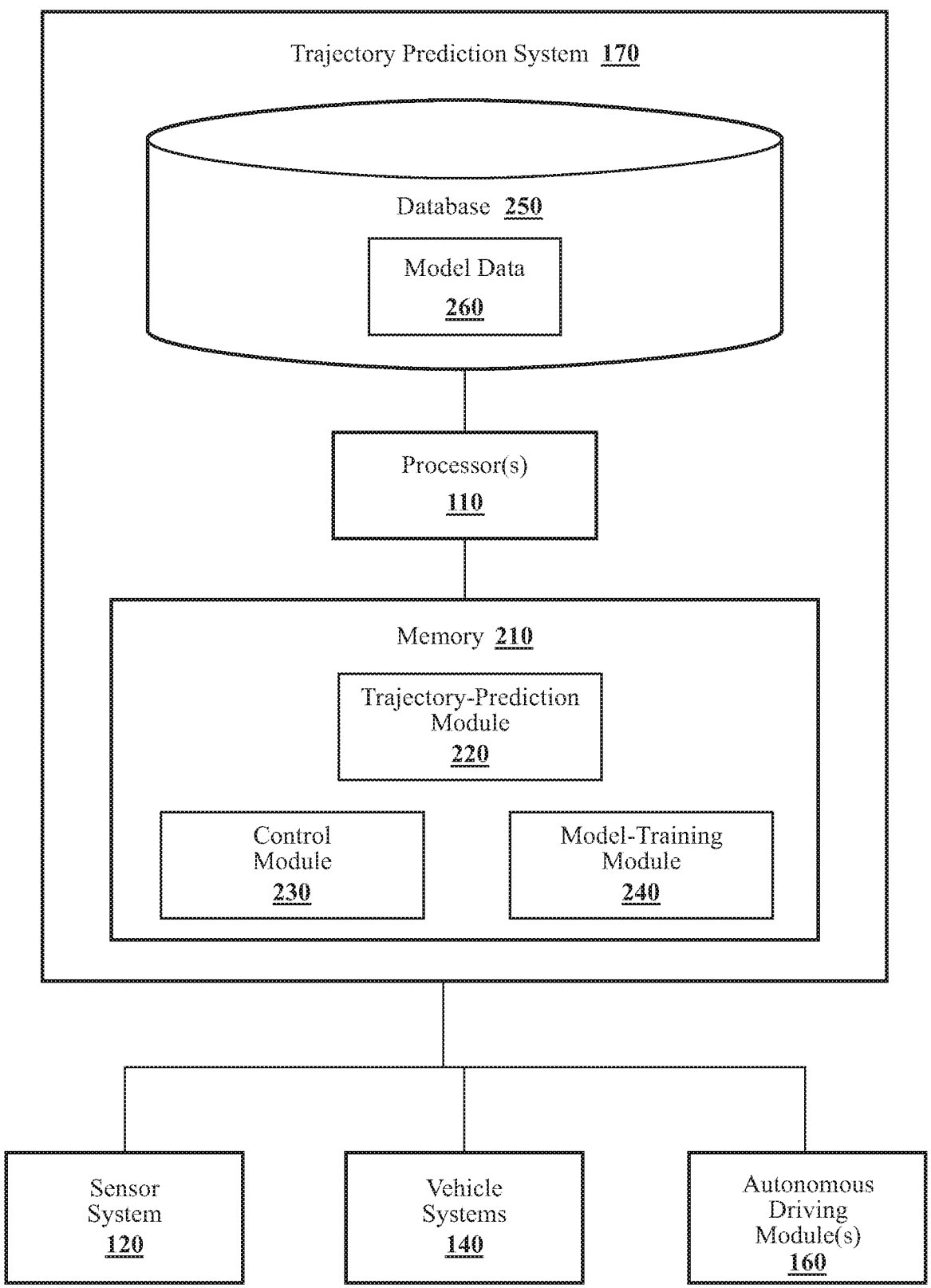
FIG. 2 illustrates one embodiment of a trajectory prediction system.

With reference to FIG. 2, one embodiment of the trajectory prediction system 170 of FIG. 1 is further illustrated. The trajectory prediction system 170 is shown as including one or more processors 110 from the vehicle 100 of FIG. 1. Accordingly, the one or more processors 110 may be a part of the trajectory prediction system 170, the trajectory prediction system 170 may include one or more separate processors from the one or more processors 110 of the vehicle 100, or the trajectory prediction system 170 may access the one or more processors 110 through a data bus or another communication path, depending on the embodiment. In one embodiment, the trajectory prediction system 170 includes a memory 210 that stores a trajectory-prediction module 220, a control module 230, and a model-training module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the one or more processors 110, cause the one or more processors 110 to perform the various functions disclosed herein.

In connection with predicting the trajectory of vehicle 100, trajectory prediction system 170 can store various kinds of model-related data 260 in database 250. As shown in FIG. 1, trajectory prediction system 170 receives sensor data from a sensor system 120 in vehicle 100 (the ego vehicle). For example, in some embodiments, trajectory prediction system 170 receives image data from one or more cameras 126. Trajectory prediction system 170 may also receive LIDAR data from LIDAR sensors 124, radar data from radar sensors 123, and/or sonar data from sonar sensors 125, depending on the particular embodiment. In some embodiments, trajectory prediction system 170 also receives inputs from vehicle systems 140. Examples include, without limitation, steering wheel angle, gas pedal (accelerator) position, linear velocity, and angular velocity. Steering-wheel-angle and gas-pedal-position data are examples of what may be termed controller-area-network (CAN bus) data, and linear velocity and angular velocity are examples of what may be termed Inertial Measurement Unit (IMU) data. Certain of the above types of sensor data pertain to predicting the trajectory of vehicle 100 (the ego vehicle) but not to predicting the trajectory of an external road agent, as explained further below. As also indicated in FIG. 1, trajectory prediction system 170, in particular control module 230, can communicate with vehicle systems 140 and/or autonomous driving module(s) 160 to assume semi-autonomous or autonomous control over various functions of vehicle 100 such as steering, braking, and throttle.

Trajectory-prediction module 220 generally includes instructions that cause the one or more processors 110 to produce one or more trajectory predictions for vehicle 100 (the ego vehicle) and one or more trajectory predictions for at least one external road agent. As discussed above, in various embodiments, the predicted trajectories of an external road agent are fed as inputs to the trajectory predictors for the ego vehicle to iteratively update the predicted trajectories of the ego vehicle, and the predicted trajectories of the ego vehicle are fed as inputs to the trajectory predictors for the road agent to iteratively update the predicted trajectories of the road agent. As explained further below, in some embodiments this is generalized to the case of a plurality of road agents. In those embodiments, the predicted trajectories of multiple road agents can be fed as inputs to the trajectory predictors for the ego vehicle. Also, the predicted trajectories of other road agents can be fed as inputs to the trajectory predictors for a given road agent so that the iterative updating of the predicted trajectories for a particular road agent are based not only on the iteratively updated predicted trajectories of the ego vehicle but also those of the other detected road agents.

Figure 3A:
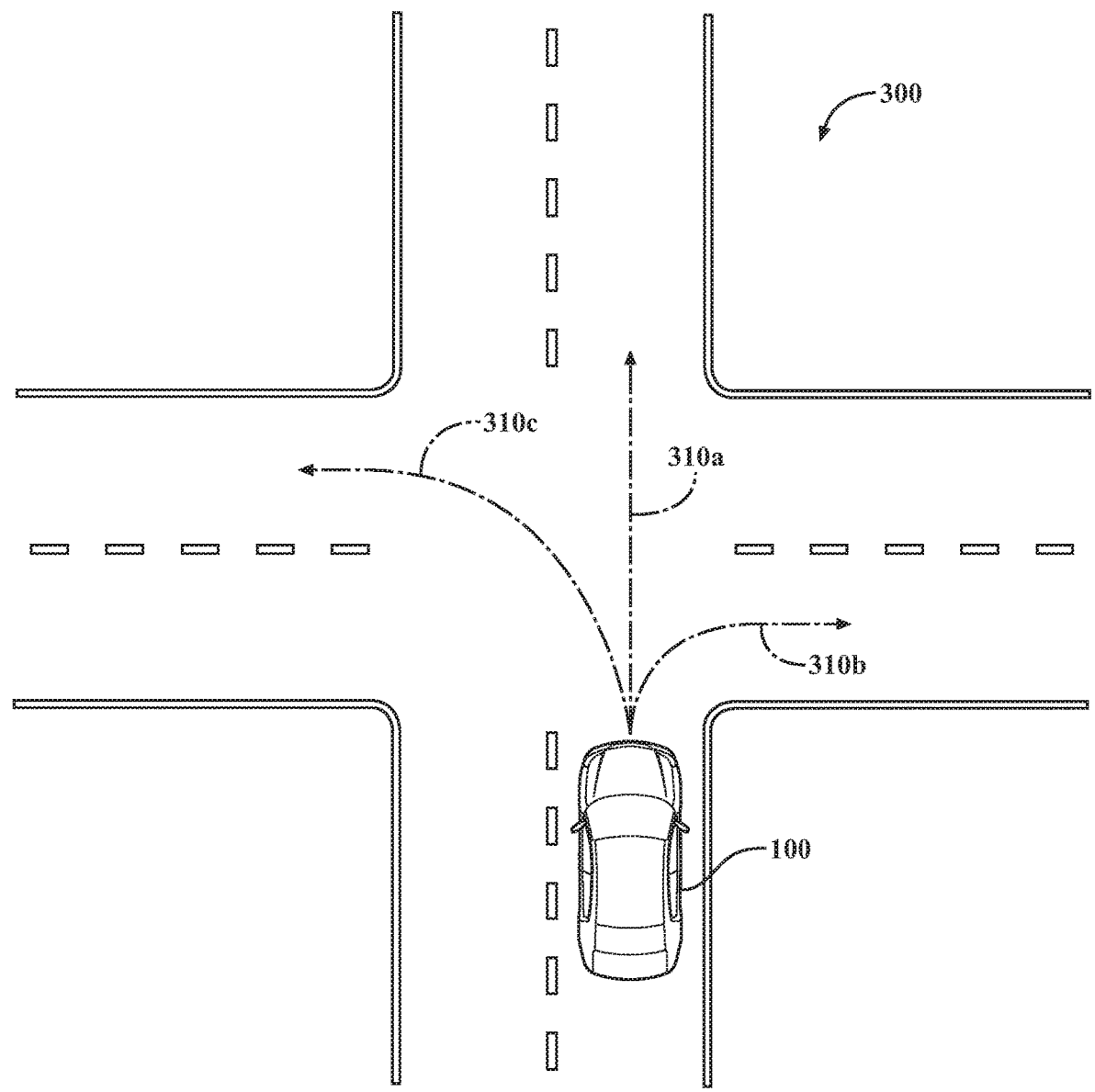
FIG. 3A illustrates one example of predicting the trajectory of an ego vehicle.

FIG. 3A illustrates one example of a situation in which predicting the trajectory of vehicle 100 (the ego vehicle) might be desired. In FIG. 3A, vehicle 100 is approaching an intersection 300. At intersection 300, vehicle 100 has at least three choices: (1) proceed straight (trajectory 310*a*); (2) turn right (trajectory 310*b*); or (3) turn left (trajectory 310*c*). In some embodiments, trajectory-prediction module 220 produces, for the various possible ego-vehicle trajectories, probability distributions conditioned on the ego vehicle's past trajectory and current vehicle sensor inputs. Specific predicted ego-vehicle trajectories can be generated by sampling the probability distributions. In some embodiments, trajectory-prediction module 220 also generates a confidence estimate for each predicted vehicle trajectory. Any or all of this information (statistical parameters defining probability distributions, predicted trajectories sampled from the probability distributions, and confidence scores) can be output to other functional units of trajectory prediction system 170 such as control module 230, as explained further below.

Figure 3B:
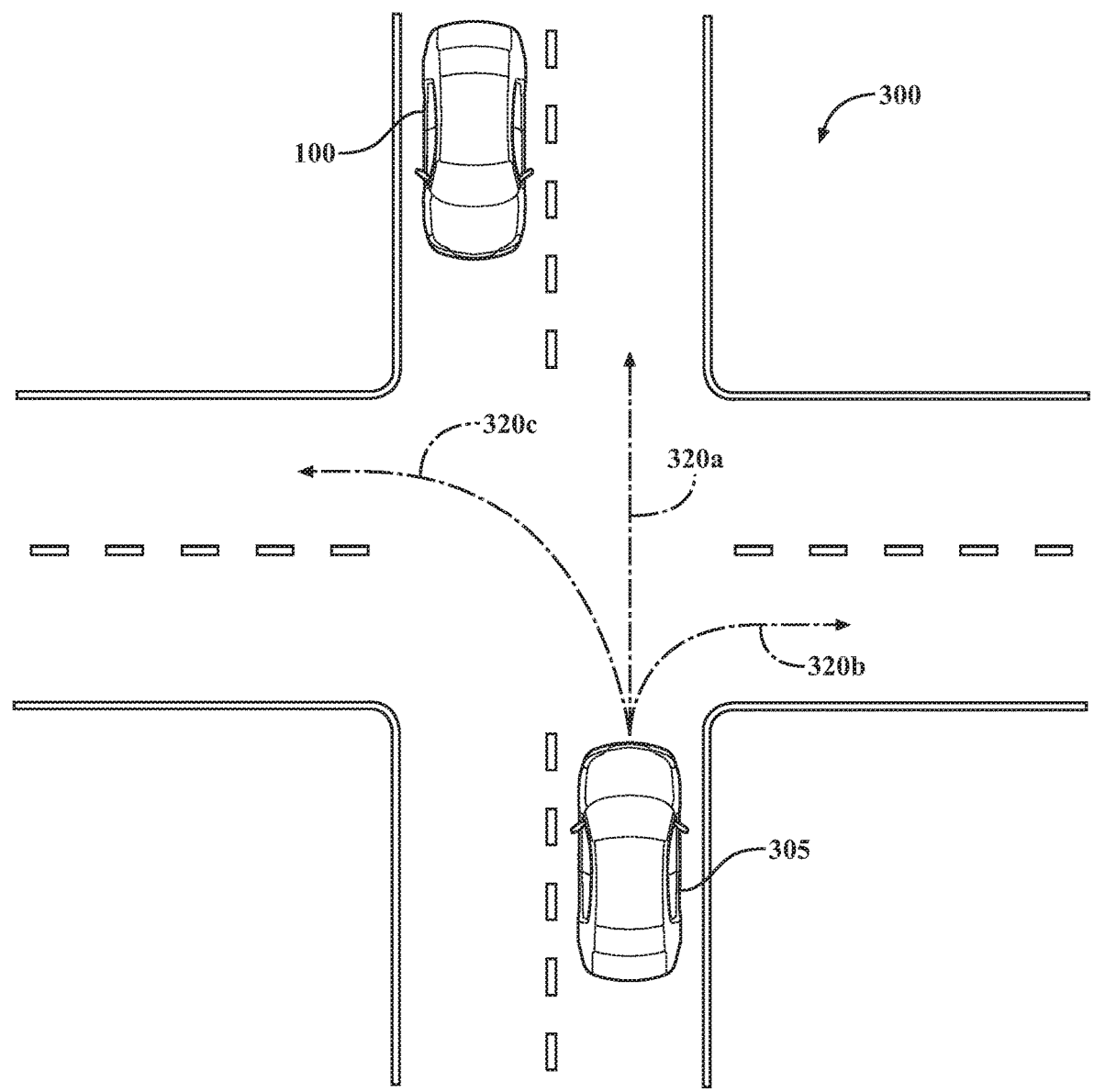
FIG. 3B illustrates one example of predicting the trajectory of a road agent external to a vehicle.

FIG. 3B illustrates an example of a situation in which predicting the trajectory of an external road agent might be desired. In FIG. 3B, vehicle 100 (the ego vehicle) and an external road agent 305 are approaching an intersection 300 from opposite directions. At intersection 300, road agent 305 (in this example, another automobile) has at least three choices: (1) proceed straight (trajectory 320*a*); (2) turn right (trajectory 320*b*); or (3) turn left (trajectory 320*c*). In some embodiments, trajectory-prediction module 220 produces, for the various possible road-agent trajectories, probability distributions conditioned on the road agent's past trajectory and current vehicle sensor inputs. Specific predicted road-agent trajectories can be generated by sampling the probability distributions. In some embodiments, trajectory-prediction module 220 also generates a confidence estimate for each predicted road-agent trajectory. Any or all of this information (statistical parameters defining probability distributions, predicted trajectories sampled from the probability distributions, and confidence scores) can be output to other functional units of trajectory prediction system 170 such as control module 230, as explained further below.

Though FIGS. 3A and 3B illustrate trajectory prediction occurring at an intersection, the applicability of trajectory-prediction module 220 is not limited to intersections. For example, ego-vehicle trajectory prediction can also apply when vehicle 100 is traveling along a highway where there is no intersection. For example, vehicle 100, particularly when driven by a human driver, can follow a trajectory within a given lane of a roadway that deviates from the ideal of remaining perfectly in the center of the lane at all times. This can occur for a variety of reasons such as normal driver error and variability, driver inattentiveness, intentional steering to dodge an object or debris on the roadway, etc. In other words, trajectories in which vehicle 100 meanders within a given lane (or even drifts into an adjacent lane or beyond the shoulder of the road) are possible, and trajectory-prediction module 220, is configured, in some embodiments, to predict such trajectories. Likewise, predicting the trajectory of an external road agent can also apply when vehicle 100 is traveling along a highway where there is no intersection. For example, on a highway, vehicle 100 can encounter vehicles in adjacent lanes, vehicles traveling in the opposite direction, pedestrians or animals darting onto the roadway, etc.

Figure 4:
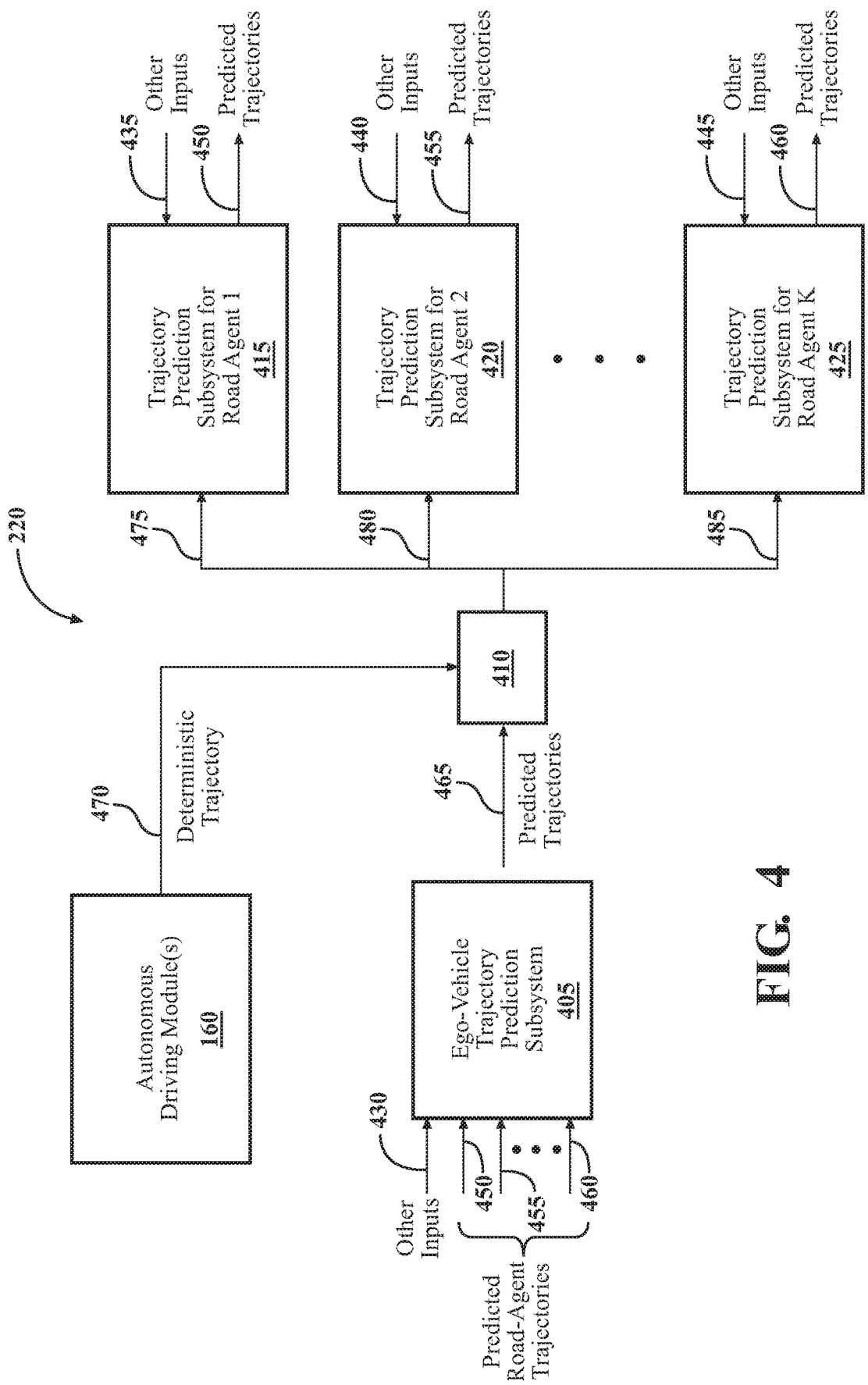
FIG. 4 is a block diagram of a trajectory prediction module, in accordance with an illustrative embodiment of the invention.

FIG. 4 is a block diagram of a trajectory prediction module 220, in accordance with an illustrative embodiment of the invention. In this embodiment, trajectory-prediction module 220 includes ego-vehicle trajectory prediction subsystem 405 and a trajectory prediction subsystem for each of K external road agents (elements 415, 420, and 425 in FIG. 4), where K is greater than or equal to 1. A selection function 410 of trajectory-prediction module 220 feeds either the predicted ego-vehicle trajectories 465 or a deterministic ego-vehicle trajectory 470 output by autonomous driving module(s) 160 to the respective inputs (475, 480, and 485) of the road-agent trajectory prediction subsystems (415, 420, and 425), depending on the mode in which vehicle 100 is currently operating. When vehicle 100 is operating in a mode in which a human driver is in control of steering (e.g., with a driver-assistance system engaged), selection function 410 routes the predicted ego-vehicle trajectories 465 to the respective inputs (475, 480, and 485) of the road-agent trajectory prediction subsystems (415, 420, and 425). When vehicle 100 is operating in an autonomous driving mode (no driver control over steering), the deterministic (known) trajectory 470 of vehicle 100 is instead fed to the inputs of the road-agent trajectory prediction subsystems just mentioned. Inputting a deterministic ego-vehicle trajectory 470 when vehicle 100 is operating in a fully autonomous driving mode reduces the complexity of road-agent trajectory prediction.

Ego-vehicle trajectory prediction subsystem 405 also receives, as inputs, the predicted trajectories (450, 455, and 460) output by the respective road-agent trajectory prediction subsystems (415, 420, and 425). Ego-vehicle trajectory prediction subsystem 405 also receives other inputs 430, including various types of vehicle sensor data, as discussed further below. Similarly, each road-agent trajectory prediction subsystem (415, 420, or 425) receives other inputs (435, 440, or 445, respectively), which include various types of vehicle sensor data and the predicted trajectories of the other K−1 road agents, as discussed further below. As also discussed below, the vehicle sensor data input to ego-vehicle trajectory prediction subsystem 405 can differ somewhat from that input to the road-agent trajectory prediction subsystems (415, 420, and 425).

Figure 10:
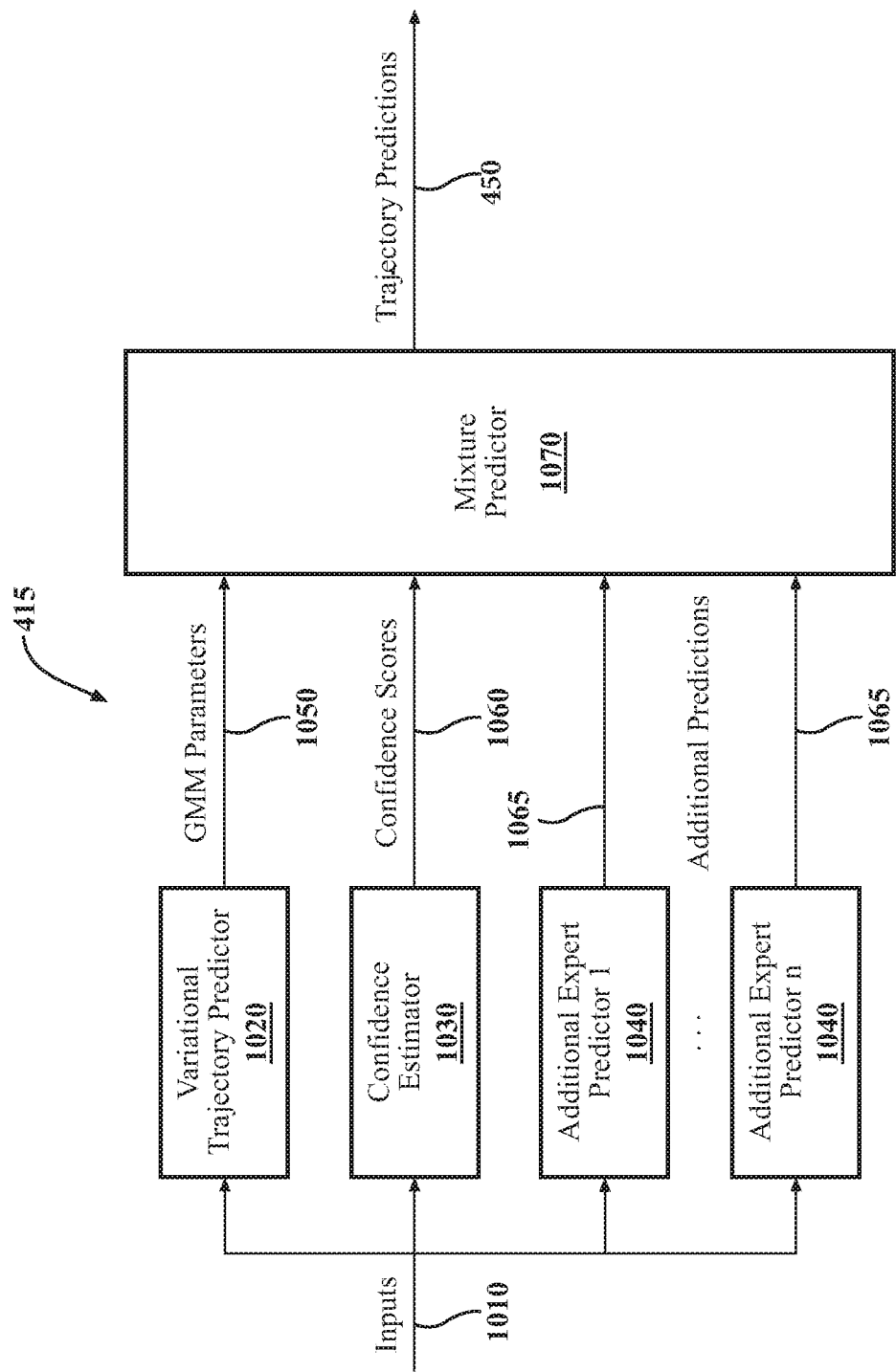
FIG. 10 is a block diagram of a road-agent trajectory prediction subsystem, in accordance with an illustrative embodiment of the invention.
Figure 11:
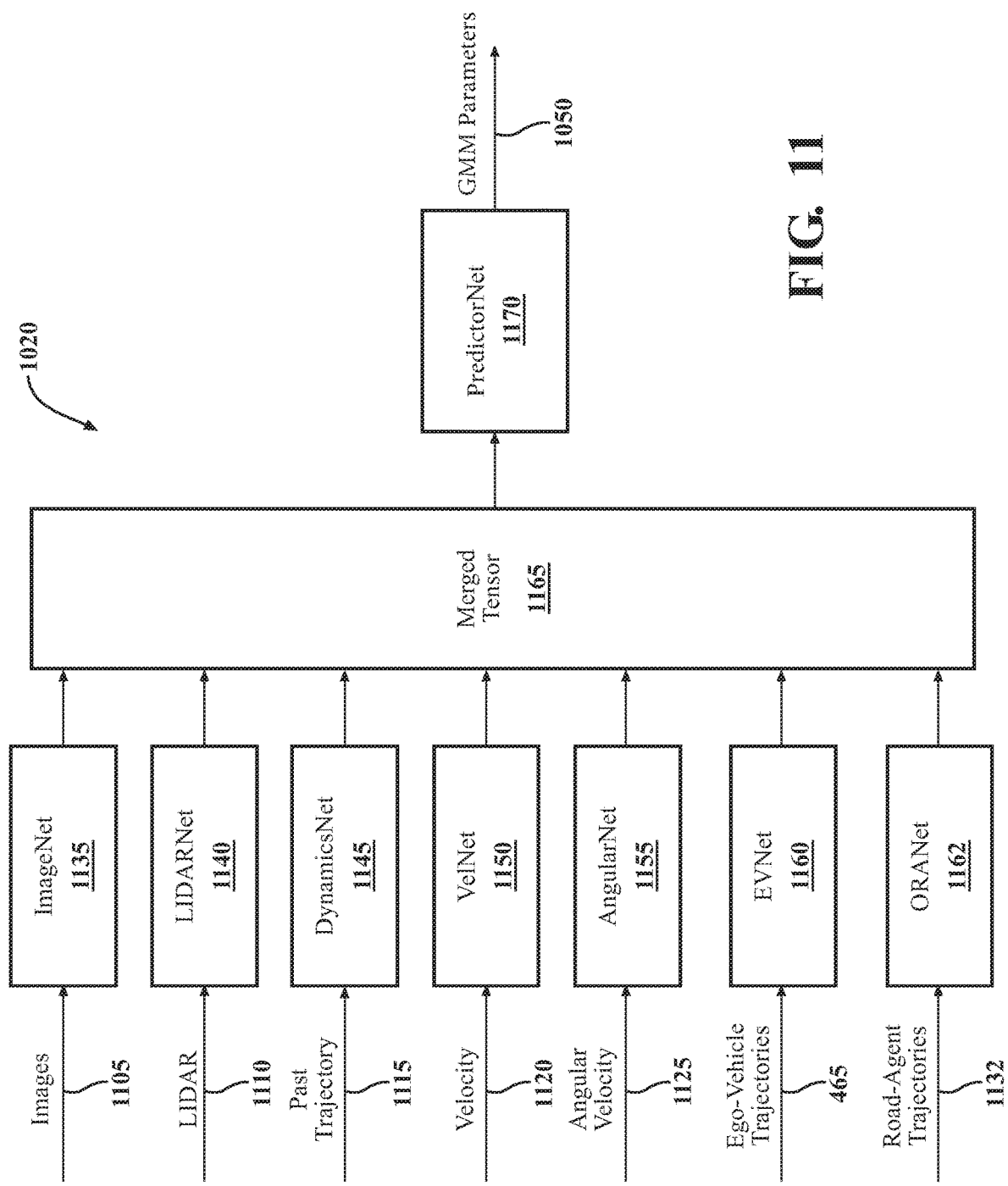
FIG. 11 is a block diagram of a road-agent variational trajectory predictor, in accordance with an illustrative embodiment of the invention.
Figure 12:
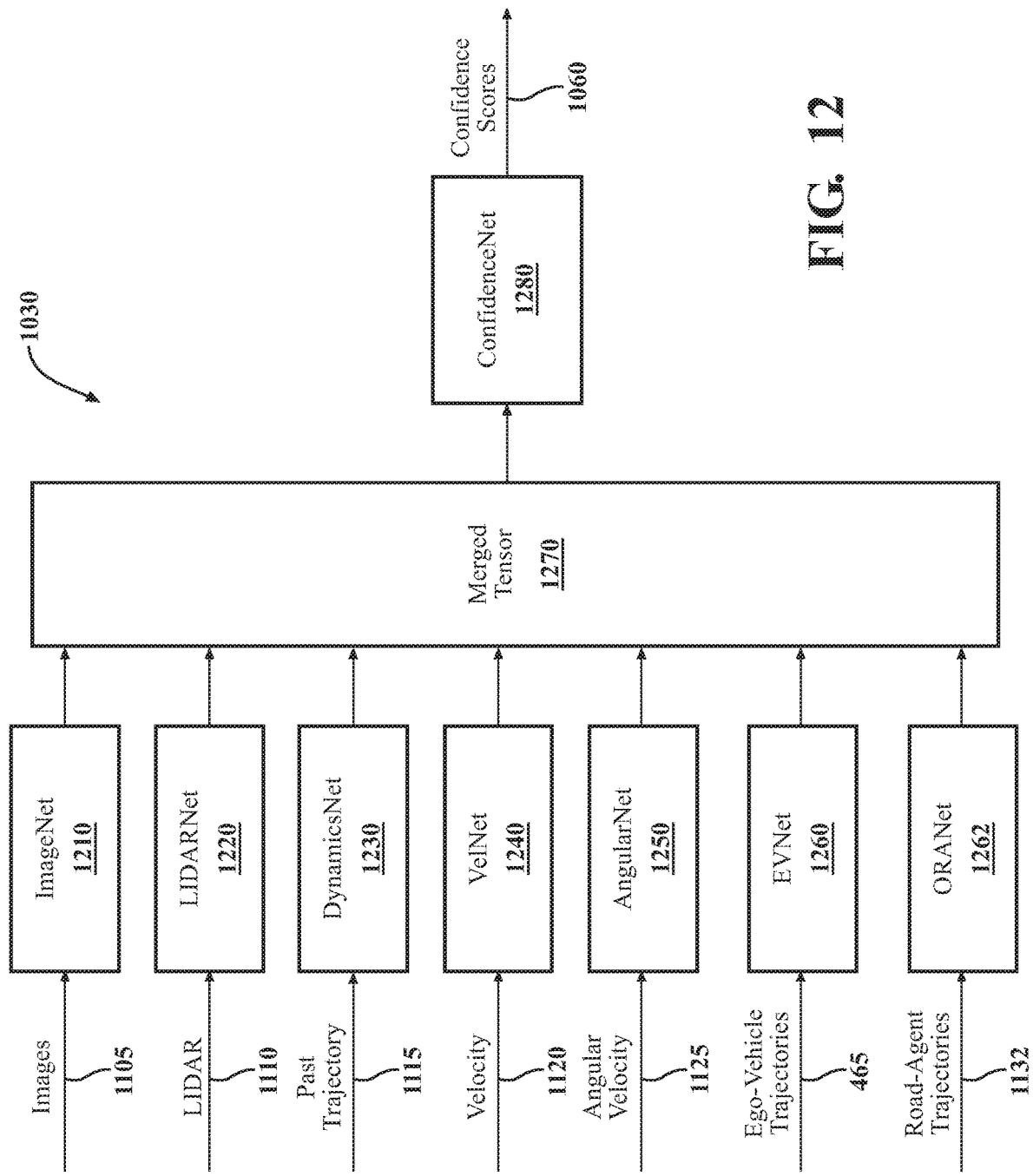
FIG. 12 is a block diagram of a road-agent confidence estimator, in accordance with another illustrative embodiment of the invention.

The remainder of this description is organized as follows. The discussion of FIGS. 5-9 is devoted to a more detailed description of particular embodiments of ego-vehicle trajectory prediction subsystem 405. The discussion of FIGS. 10-12 is devoted to a more detailed description of particular embodiments of road-agent trajectory prediction subsystem 415 (this description generalizes to the other road-agent trajectory prediction subsystems 420 and 425 shown in FIG. 4). The methods of various embodiments are then discussed in connection with FIGS. 13 and 14.

Figure 5:
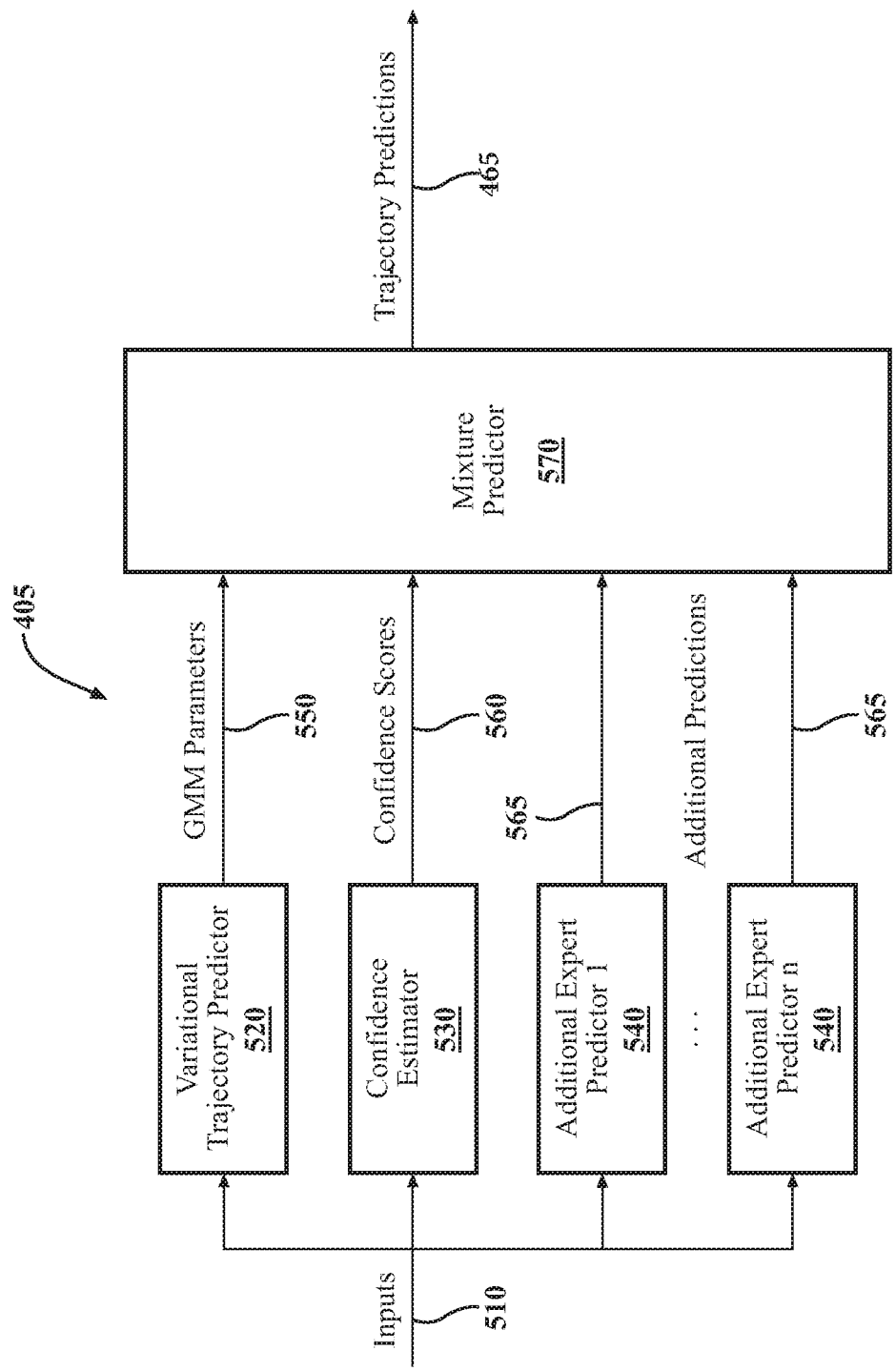
FIG. 5 is a block diagram of an ego-vehicle trajectory prediction subsystem, in accordance with an illustrative embodiment of the invention.

FIG. 5 is a block diagram of an ego-vehicle trajectory prediction subsystem 405, in accordance with an illustrative embodiment of the invention. In this particular embodiment, the inputs 510, which include predicted road-agent trajectories (450, 455, 460) and other inputs 430, are fed to a variational trajectory predictor 520, a confidence estimator 530, and one or more additional expert predictors 540, each of which produces an additional expert trajectory prediction 565. In general, there may be n additional expert predictors 540 in this mixture-of-experts architecture, where n is greater than or equal to 1. In one particular embodiment, a first predicted vehicle trajectory is generated by variational trajectory predictor 520, and a second predicted vehicle trajectory is generated by an additional expert predictor 540 employing a different computational model (e.g., a physics-based model). In that embodiment, an odometry-based predictor is employed that uses a wheel-odometry model to compute the future positions of vehicle 100 by assuming that vehicle 100 travels at constant turning rate and velocity. Thus, as just illustrated, the trajectory predictors in trajectory-prediction module 220 can employ different computational models, in some embodiments.

In the embodiment shown in FIG. 5, variational trajectory predictor 520 includes a model that assumes future vehicle trajectories, projected onto a polynomial basis, form a Gaussian mixture model (GMM) with diagonal covariance matrices. Given a trajectory $\tau_x(t): [0, T] \to \mathbb{R}^2$ and function basis B, the projection coefficients $c_x$ can be computed as $c_x = \text{Proj}_B(\tau)$, and the trajectory r can be computed as $\tau_x = Bc$. The bold typeface of certain variables indicates that these are vector quantities. Analogous relationships apply to the trajectory $\tau_y$ and projection coefficients $c_y$. Thus, a probability distribution over future trajectory can be transformed from a set of projection coefficients, and each projection coefficient is represented as a GMM. The number of components represents the distribution of the likely movements of vehicle 100. For instance, using four components may yield two μ (mean) components that are nearly identical, and two other more distinct components. This would indicate that there are three distinct likely trajectories. The GMM parameters 550 produced by variational trajectory predictor 520 include the weights w, the means $\mu_x$ and $\mu_y$, and the variances $\sigma_x^2$ and $\sigma_y^2$ of the projection coefficients associated with a future trajectory. Specific predicted trajectories of the ego vehicle can be generated by sampling the trajectory probability distributions discussed above. In some embodiments, the parameters of the probability distributions are output instead of or in addition to specific predicted trajectories. The structure of variational trajectory predictor 520 is discussed in greater detail below.

As will be seen below, confidence estimator 530 has a structure that is similar to that of variational trajectory predictor 520. In the embodiment shown in FIG. 5, confidence estimator 530 outputs a set of second-order polynomial coefficients that map the applicable predictive temporal horizon to confidence scores (e.g., L2 prediction error, root-mean-squared error) for each candidate trajectory predictor in trajectory-prediction module 220. In one embodiment, the predictive temporal horizon is 0.1 to 3 seconds for L2 prediction error. Those skilled in the art will recognize that the L2 prediction error (or loss function) is the sum of the squared differences between the true or target values and the estimated values. In other embodiments, the temporal horizon for predicting future trajectories may be longer (e.g., ten seconds). In the embodiment shown in FIG. 5, the confidence scores computed by confidence estimator 530 are a continuous function of time within a predetermined temporal horizon. Though the inputs 510 include discrete sampled data (e.g., camera images), the confidence measure itself is a continuous-time function, meaning that it can be computed for any time instant within the applicable temporal horizon. As discussed further below, the computation of the confidence scores can, in some embodiments, be augmented by the number of iterations that occur between the cross-fed ego-vehicle trajectory predictors and road-agent trajectory predictors.

In some embodiments, mixture predictor 570 chooses the best (most likely) trajectory prediction among the trajectory predictions produced by the variational trajectory predictor 520 and the n additional expert predictors 540 based on their respective confidence scores from confidence estimator 530. That is, in these embodiments, mixture predictor 570 selects as the most likely predicted vehicle trajectory the one having a confidence score 560 indicating the highest level of confidence among the candidate predicted trajectories. In other embodiments, mixture predictor 570 outputs the trajectory predictions produced by the variational trajectory predictor 520 and the n additional expert predictors 540 and their respective confidence scores 560 without selecting a best trajectory prediction. In those embodiments, the trajectory predictions and their respective confidence scores 560 (shown as trajectory predictions 465 in FIG. 5) are output to other functional units of vehicle 100, such as control module 230. In some embodiments, trajectory predictions 465 include the parameters defining the trajectory probability distributions in addition to or instead of specific trajectory predictions obtained by sampling the distributions and their associated confidence scores. If none of the predicted trajectories produced by the trajectory predictors in ego-vehicle trajectory prediction subsystem 405 is deemed trustworthy, based on the confidence scores 560, mixture predictor 570 can output a warning to that effect.

Figure 6:
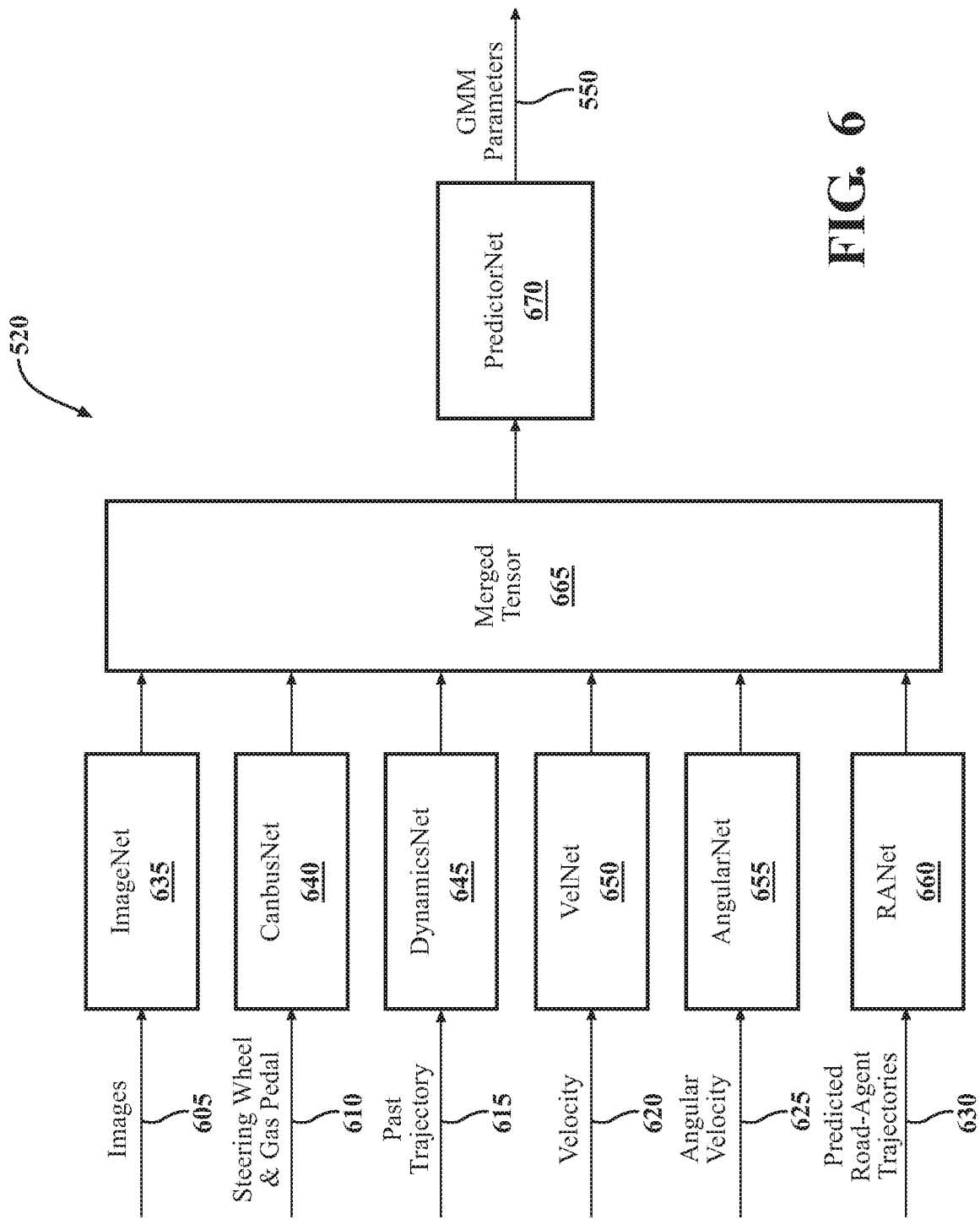
FIG. 6 is a block diagram of an ego-vehicle variational trajectory predictor, in accordance with an illustrative embodiment of the invention.

FIG. 6 is a block diagram of a variational trajectory predictor 520, in accordance with an illustrative embodiment of the invention. In this embodiment, variational trajectory predictor 520 includes a deep neural network (DNN) containing one or more child networks for each type of input data. As shown in FIG. 6, inputs 510 (refer to FIG. 5), in this embodiment, include image data (e.g., from one or more cameras 126) 605, steering wheel and gas pedal data 610, past ego-vehicle trajectory data 615, linear velocity data 620, and angular-velocity data 625. As discussed above, in other embodiments, other kinds of data from sensor system 120 can be fed to variational trajectory predictor 520, such as LIDAR, radar, and/or sonar data. The various kinds of sensor inputs just mentioned are included in the "other inputs 430" discussed in connection with FIG. 4. Which specific kinds of sensor data are fed to variational trajectory predictor 520 can vary, depending on the embodiment. As shown in FIG. 6, the inputs 510 also include predicted road-agent trajectories 630, which, collectively, include predicted road-agent trajectories 450, 455, and 460 discussed in connection with FIG. 4. When trajectory prediction module 220 begins operating from a cold start, road-agent trajectories 630 might not be available as inputs. For example, in some embodiments, the iterative process of updating the cross-fed predicted ego-vehicle and external-road-agent trajectories begins with predicting the trajectory of the ego vehicle, and road-agent trajectory predictions become available after some delay. When they become available, the road-agent trajectories 630 can then be fed to variational trajectory predictor 520.

In the embodiment shown in FIG. 6, image data 605 is fed to an images child network ("ImageNet") 635, and steering wheel and gas pedal data 610 is fed to a controller-area-network (CAN bus) child network ("CANBusNet") 640. Steering wheel data can include, for example, steering wheel angle, and gas pedal data can include, for example, gas pedal position. Both are examples of CAN bus data. Past ego-vehicle trajectory data 615 is fed to a vehicle-dynamics child network ("DynamicsNet") 645. Past ego-vehicle trajectory data 615 includes a sequence of spatial coordinates projected onto one or more coefficients of a basis function, as discussed above in connection with the model for predictions of future trajectories. Linear-velocity data 620 is fed to a linear-velocity child network ("VelNet") 650. Angular-velocity data 625 is fed to an angular-velocity child network ("AngularNet") 655. The linear-velocity data 620 and the angular-velocity data 625 are examples of Inertial-Measurement-Unit (IMU) data. The predicted road-agent trajectories 630 are fed to a road-agent-trajectories network ("RANet") 660. The outputs of the child networks in the embodiment of FIG. 6 are collected in merged tensor 665. From the data collected in merged tensor 665, predictor network ("PredictorNet") 670 calculates the GMM parameters 550 discussed above. Also, a single variational trajectory predictor such as variational trajectory predictor 520 can generate more than one predicted ego-vehicle trajectory by taking multiple samples from an ego-vehicle trajectory distribution.

Figure 7:
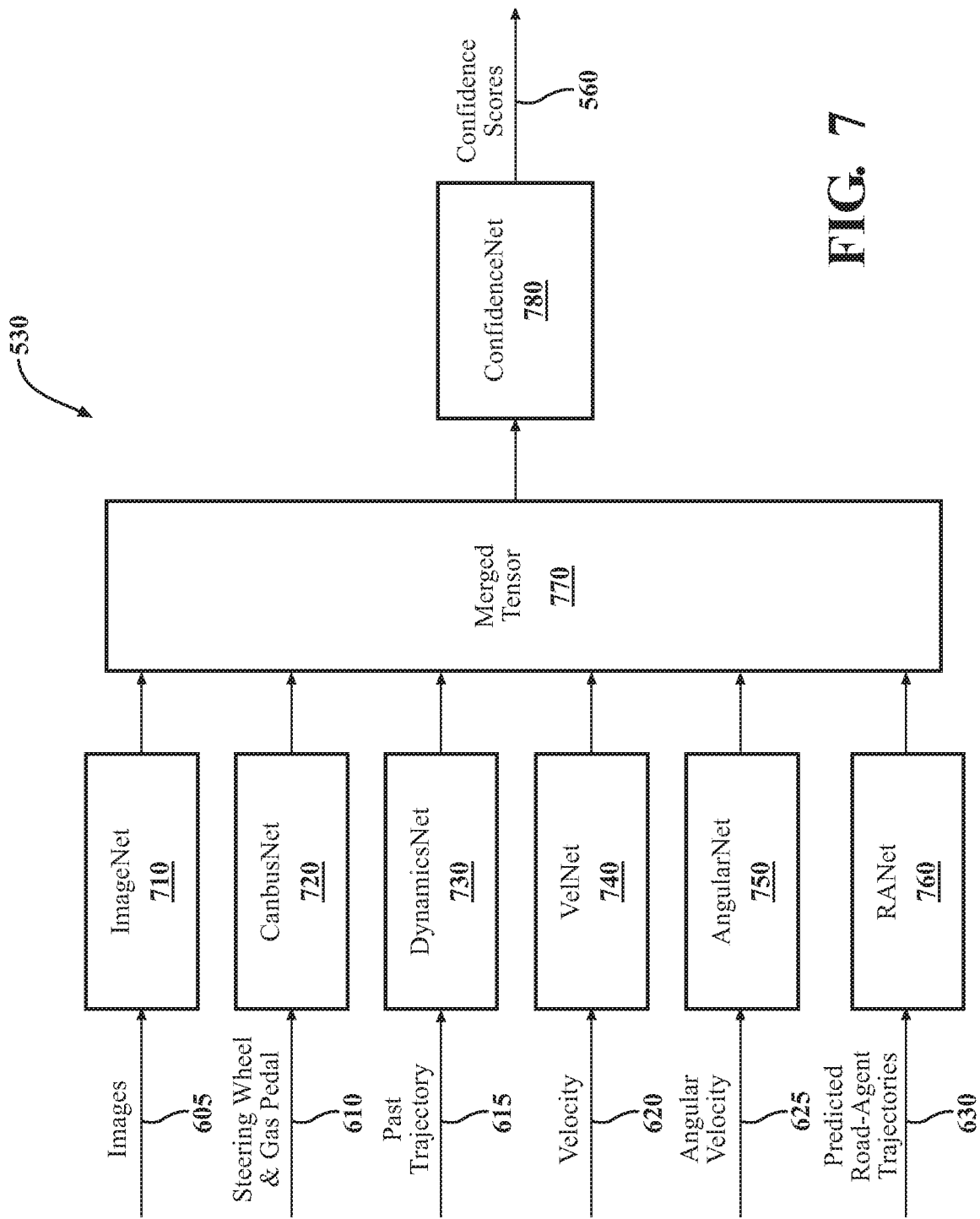
FIG. 7 is a block diagram of an ego-vehicle confidence estimator, in accordance with an illustrative embodiment of the invention.

FIG. 7 is a block diagram of a confidence estimator 530, in accordance with an illustrative embodiment of the invention. As mentioned above, confidence estimator 530, in this embodiment, has a structure similar to that of variational trajectory predictor 520. That is, it includes its own separate DNN with one or more child networks for each type of input data. As shown in FIG. 7, confidence estimator 530 receives and processes the inputs 510 discussed in connection with FIG. 6. More specifically, image data 605 is fed to ImageNet 710, steering wheel and gas pedal data 610 is fed to CANBusNet 720, past-trajectory data 615 is fed to DynamicsNet 730, linear-velocity data 620 is fed to VelNet 740, angular-velocity data 625 is fed to AngularNet 750, and predicted road-agent trajectories 630 are fed to RANet 760. The outputs of these child networks are collected in merged tensor 770. Confidence network ("ConfidenceNet") 780 computes the confidence scores 560 as a continuous function of time within the temporal horizon of the trajectory predictions based on the data in merged tensor 770. As discussed below, the computation of the confidence scores can, in some embodiments, be augmented by the number of iterations that occur between the cross-fed ego-vehicle trajectory predictors and road-agent trajectory predictors. As discussed above in connection with variational trajectory predictor 520, in some embodiments, other types of sensor data such as LIDAR, radar, and/or sonar may be fed to confidence estimator 530.

Figure 8:
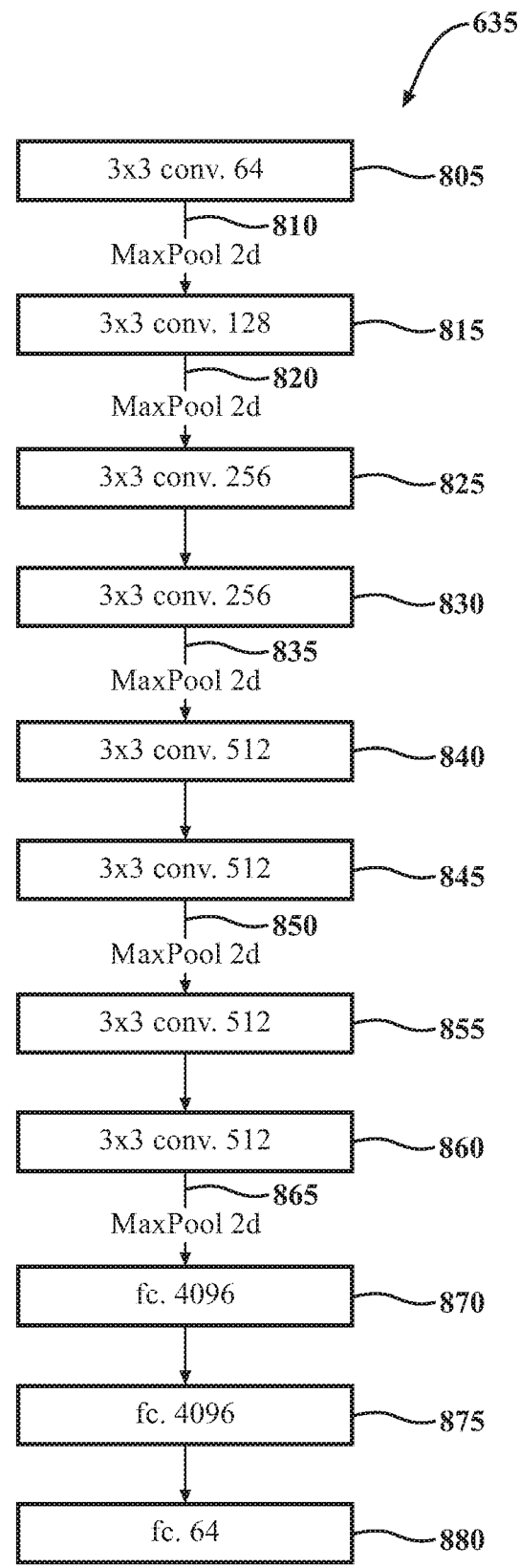
FIG. 8 is a block diagram of a child network for image input data, in accordance with an illustrative embodiment of the invention.

FIG. 8 is a block diagram of a child network for image input data (ImageNet 635), in accordance with an illustrative embodiment of the invention. As shown in FIG. 8, in this particular embodiment, input image data (e.g., from front and side cameras 126) is processed through the following series of stages/layers: 64-layer 3×3 convolutional processing stage 805, max pooling 2D layer 810, 128-layer 3×3 convolutional processing stage 815, max pooling 2D layer 820, 256-layer 3×3 convolutional processing stage 825, 256-layer 3×3 convolutional processing stage 830, max pooling 2D layer 835, 512-layer 3×3 convolutional processing stage 840, 512-layer 3×3 convolutional processing stage 845, max pooling 2D layer 850, 512-layer 3×3 convolutional processing stage 855, 512-layer 3×3 convolutional processing stage 860, max pooling 2D layer 865, 4096-unit fully connected layer 870, 4096-unit fully connected layer 875, and 64-unit fully connected layer 880. As those skilled in the art are aware, max (maximum) pooling 2D is a technique for reducing the size of images by taking the maximum value within 2×2-pixel image regions. In some embodiments, the output of ImageNet 635 can be fed to and accumulated in a long short-term memory (LSTM) network (not shown in FIG. 8).

Figure 9:
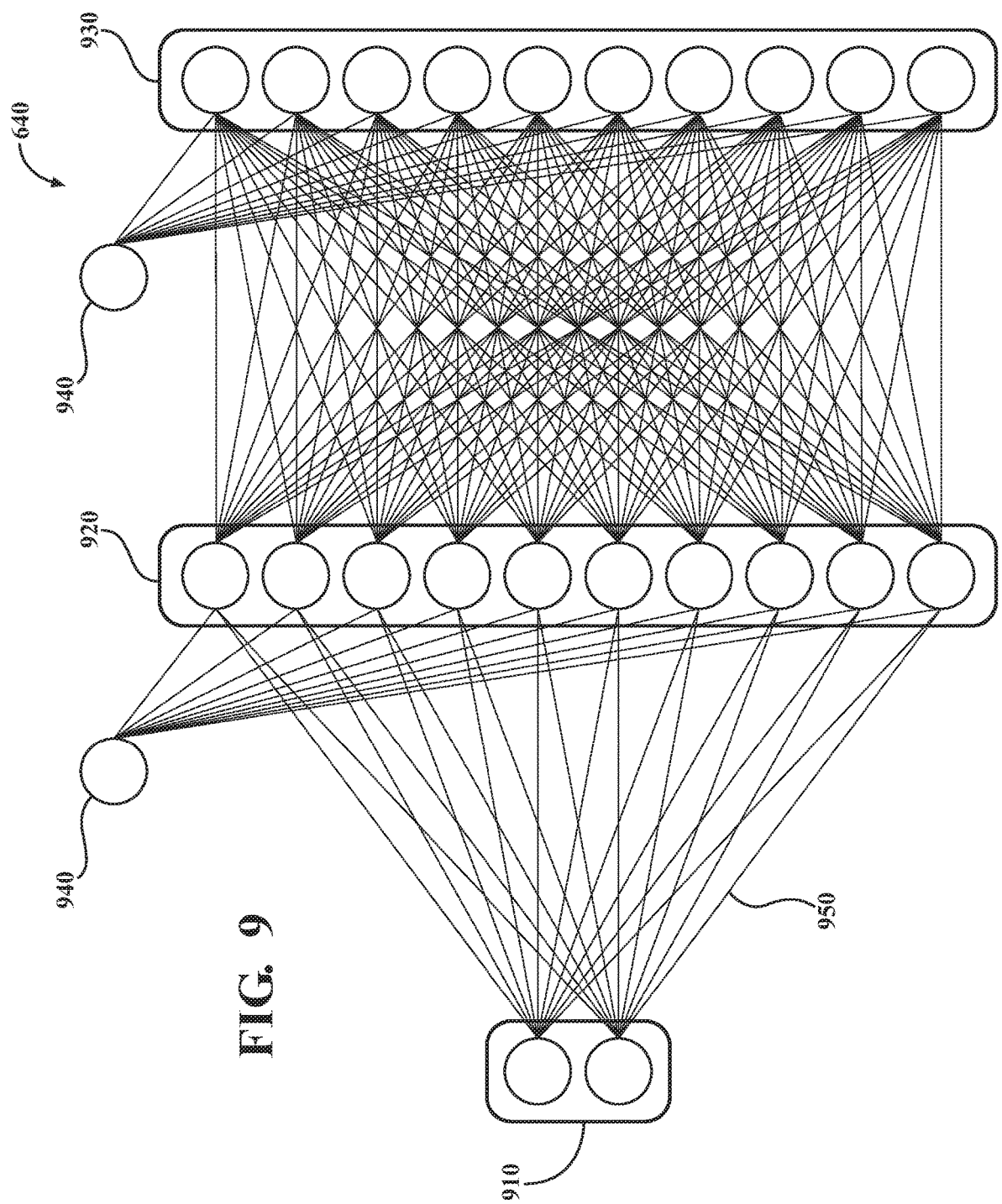
FIG. 9 is a block diagram of a child network for controller-area-network (CAN bus) input data, in accordance with an illustrative embodiment of the invention.

FIG. 9 is a block diagram of a child network for controller-area-network (CAN bus) input data (CANBusNet 640), in accordance with an illustrative embodiment of the invention. As shown in FIG. 9, CANBusNet 640 is a fully connected neural network having two fully connected layers. Input layer 910 receives two inputs: (1) steering wheel angle data and (2) gas pedal position data. Those inputs are fed to hidden layer 920, where each unit of the network is computed by multiplying each input value by a weight 950 and summing the multiplications with a bias value 940. Hidden layer 920 is called "hidden" because the values in that layer are not explicitly known, as those skilled in the art are aware. Output layer 930 has a structure similar to that of hidden layer 920, except that each unit in output layer 930 is connected to more units in the previous hidden layer 920. In some embodiments, the other child networks besides ImageNet 635 have a structure similar to CANBusNet 640, though, in some cases, only a single input is fed to the network instead of two. The description next turns to a more detailed explanation of specific embodiments of a road-agent trajectory prediction subsystem (415) that forms part of trajectory-prediction module 220.

FIG. 10 is a block diagram of a road-agent trajectory prediction subsystem 415, in accordance with an illustrative embodiment of the invention. Though FIG. 10 focuses on road-agent trajectory prediction subsystem 415 as a specific example, the description below also applies to the other K−1 road-agent trajectory prediction subsystems referenced in FIG. 4. In this particular embodiment, the inputs 1010, which include predicted ego-vehicle trajectories 465 or deterministic ego-vehicle trajectory 470 and other inputs 435 (see FIG. 4) are fed to a variational trajectory predictor 1020, a confidence estimator 1030, and one or more additional expert predictors 1040, each of which produces an additional expert trajectory prediction 1065 for the subject external road agent. In general, there may be n additional expert predictors 1040 in this mixture-of-experts architecture. In one embodiment, one of these additional expert predictors 1040 is a physics-based (deterministic) model. As those skilled in the art are aware, a physics-based model analyzes the dynamics of a detected road agent based on sensor data (image, LIDAR, etc.). Thus, as just illustrated, the trajectory predictors in road-agent trajectory prediction subsystem 415 can employ different computational models, in some embodiments. It should be noted that, though FIG. 10, for simplicity, shows all of the inputs 1010 being fed to each of the road-agent trajectory predictors, a given trajectory predictor might not actually make use of all of the inputs 1010, depending on the embodiment.

Similar to the discussion of ego-vehicle trajectory prediction above, in the embodiment shown in FIG. 10, variational trajectory predictor 1020 includes a model that assumes future road-agent trajectories, projected onto a polynomial basis, form a Gaussian mixture model (GMM) with diagonal covariance matrices. Given a trajectory $\tau_x(t): [0, T] \to \mathbb{R}^2$ and function basis B, the projection coefficients $c_x$ can be computed as $c_x = \text{Proj}_B(\tau)$, and the trajectory r can be computed as $\tau_x = Bc$. The bold typeface of certain variables indicates that these are vector quantities. Analogous relationships apply to the trajectory $\tau_y$ and projection coefficients $c_y$. Thus, a probability distribution over future trajectory can be transformed from a set of projection coefficients, and each projection coefficient is represented as a GMM. The number of components represents the distribution of the likely movements of a detected road agent. For instance, using four components may yield two μ (mean) components that are nearly identical, and two other more distinct components. This would indicate that there are three distinct likely trajectories for the road agent. The GMM parameters 1050 produced by variational trajectory predictor 1020 include the weights w, the means $\mu_x$ and $\mu_y$, and the variances $\sigma_x^2$ and $\sigma_y^2$ of the projection coefficients associated with a future road-agent trajectory. Specific predicted trajectories of a road agent can be generated by sampling the trajectory probability distributions discussed above. In some embodiments, the parameters of the probability distributions are output instead of or in addition to specific predicted trajectories. The structure of variational trajectory predictor 1020 is discussed in greater detail below.

As will be seen below, confidence estimator 1030 has a structure that is similar to that of variational trajectory predictor 1020. In the embodiment shown in FIG. 10, confidence estimator 1030 outputs a set of second-order polynomial coefficients that map the applicable predictive temporal horizon to confidence scores (e.g., L2 prediction error, root-mean-squared error) for each candidate road-agent trajectory predictor in road-agent trajectory prediction subsystem 415. In one embodiment, the predictive temporal horizon is 0.1 to 3 seconds for L2 prediction error. Those skilled in the art will recognize that the L2 prediction error (or loss function) is the sum of the squared differences between the true or target values and the estimated values. In other embodiments, the temporal horizon for predicting future trajectories may be longer (e.g., ten seconds). In the embodiment shown in FIG. 10, the confidence scores computed by confidence estimator 1030 are a continuous function of time within a predetermined temporal horizon, which can be the same as the predetermined temporal horizon associated with ego-vehicle trajectory predictions 465, or it can be a different predetermined temporal horizon, depending on the particular embodiment. Though the inputs 1010 include discrete sampled data (e.g., camera images, LIDAR point-cloud data), the confidence measure itself is a continuous-time function, meaning that it can be computed for any time instant within the applicable temporal horizon. As discussed below, the computation of the confidence scores can, in some embodiments, be augmented by the number of iterations that occur between the cross-fed ego-vehicle trajectory predictors and road-agent trajectory predictors.

In some embodiments, mixture predictor 1070 chooses the best (most likely) road-agent trajectory prediction among the trajectory predictions produced by the variational trajectory predictor 1020 and the n additional expert predictors 1040 based on their respective confidence scores from confidence estimator 1030. That is, in these embodiments, mixture predictor 1070 selects as the most likely predicted road-agent trajectory the one having a confidence score 1060 indicating the highest level of confidence among the candidate predicted road-agent trajectories. In other embodiments, mixture predictor 1070 outputs the road-agent trajectory predictions produced by the variational trajectory predictor 1020 and the n additional expert predictors 1040 and their respective confidence scores 1060 without selecting a best road-agent trajectory prediction. In those embodiments, the trajectory predictions and their respective confidence scores 1060 (shown as trajectory predictions 450 in FIG. 10) are output to other functional units of vehicle 100, such as control module 230. In some embodiments, the trajectory predictions 450 include the parameters defining the trajectory probability distributions in addition to or instead of specific trajectory predictions obtained by sampling the distributions and their associated confidence scores. If none of the predicted road-agent trajectories produced by the trajectory predictors in trajectory-prediction module 220 is deemed trustworthy, based on their respective confidence scores 1060, mixture predictor 1070 can output a warning to that effect.

FIG. 11 is a block diagram of a variational trajectory predictor 1020, in accordance with an illustrative embodiment of the invention. In this embodiment, variational trajectory predictor 1020 includes a deep neural network (DNN) containing one or more child networks for each type of input data. As shown in FIG. 11, inputs 1010 (refer to FIG. 10), in this embodiment, include image data (e.g., from one or more cameras 126) 1105, LIDAR data 1110, past road-agent trajectory data 1115 (i.e., data pertaining to the measured past trajectory of the subject road agent), estimated linear velocity data 1120 for the road agent, and estimated angular-velocity data 1125 for the road agent. As discussed above, the linear and angular velocity of a road agent can be estimated based on sensor data from sensor system 120 of vehicle 100. In other embodiments, CAN bus and/or IMU data for an external road agent can be obtained directly from the external road agent itself via vehicle-to-vehicle (V2V) communication. In such an embodiment, an external road agent operating in a fully autonomous driving mode can also transmit a deterministic trajectory to vehicle 100 to reduce the uncertainty in the ego vehicle's trajectory planning. Sensor and/or deterministic-trajectory information obtained from an external road agent via V2V communication is another type of sensor data that can be used by trajectory prediction system 170 in controlling the operation of vehicle 100.

In some embodiments, other or additional kinds of data from sensor system 120 can be fed to variational trajectory predictor 1020, such as radar, and/or sonar data. Additionally, more highly structured data such as a rasterized map (e.g., an occupancy grid for the environment surrounding vehicle 100) can be fed to variational trajectory predictor 1020, in some embodiments. Which specific kinds of raw sensor data or structured data are fed to variational trajectory predictor 1020 can vary, depending on the embodiment. The various kinds of vehicle sensor data and structured data discussed above are included in the "other inputs 435" to road-agent trajectory prediction subsystem 415 discussed in connection with FIG. 4.

As shown in FIG. 11, the inputs 1010 (see FIG. 10) also include predicted ego-vehicle trajectories 465 and the predicted trajectories of other detected road agents 1132 (elements 455 and 460 in FIG. 4). The predicted trajectories of other detected road agents 1132 are also included among the "other inputs 435" to road-agent trajectory prediction subsystem 415.

In the embodiment shown in FIG. 11, image data 1105 is fed to an images child network ("ImageNet") 1135, and LIDAR data 1110 is fed to LIDAR network ("LIDARNet") 1140. Past road-agent trajectory data 1115 for the subject road agent is fed to a road-agent-dynamics child network ("DynamicsNet") 1145. Past road-agent trajectory data 1115 includes a sequence of spatial coordinates projected onto one or more coefficients of a basis function, as discussed above in connection with the model for predictions of future road-agent trajectories. Estimated linear-velocity data 1120 for the road agent is fed to a linear-velocity child network ("VelNet") 1150. Estimated angular-velocity data 1125 for the road agent is fed to an angular-velocity child network ("AngularNet") 1155. As mentioned above, a road agent's linear and angular velocity can be estimated from sensor data (image, LIDAR, radar, sonar, or a combination). Predicted ego-vehicle trajectories 465 are fed to ego-vehicle-trajectories network ("EVNet") 1160, and the predicted trajectories of other road agents 1132 are fed to other-road-agent-trajectories network ("ORANet") 1162.

The outputs of the child networks in the embodiment of FIG. 11 are collected in merged tensor 1165. From the data collected in merged tensor 1165, predictor network ("PredictorNet") 1170 calculates the GMM parameters 1050 discussed above. Also, a single variational trajectory predictor such as variational trajectory predictor 1020 can generate more than one predicted road-agent trajectory by taking multiple samples from a road-agent trajectory distribution.

FIG. 12 is a block diagram of a confidence estimator 1030, in accordance with an illustrative embodiment of the invention. As mentioned above, confidence estimator 1030, in this embodiment, has a structure similar to that of variational trajectory predictor 1020. That is, it includes its own separate DNN with one or more child networks for each type of input. As shown in FIG. 12, confidence estimator 1030 receives and processes the inputs 1010 discussed in connection with FIG. 11. More specifically, image data 1105 is fed to ImageNet 1210, LIDAR data 1110 is fed to LIDARNet 1220, past road-agent trajectory data 1115 is fed to DynamicsNet 1230, estimated road-agent linear-velocity data 1120 is fed to VelNet 1240, estimated road-agent angular-velocity data 1125 is fed to AngularNet 1250, predicted ego-vehicle trajectories 465 are fed to EVNet 1260, and the predicted trajectories of other road agents 1132 are fed to ORANet 1262. The outputs of these child networks are collected in merged tensor 1270. Confidence network ("ConfidenceNet") 1280 computes the confidence scores 1060 as a continuous function of time within the temporal horizon of the road-agent trajectory predictions based on the data in merged tensor 1270. As discussed below, the computation of the confidence scores can, in some embodiments, be augmented by the number of iterations that occur between the cross-fed ego-vehicle trajectory predictors and road-agent trajectory predictors. As discussed above in connection with variational trajectory predictor 1020, in some embodiments, other types of sensor data such as radar and/or sonar may be fed to confidence estimator 1030.

In the context of road-agent trajectory prediction subsystem 415, the structure of the child networks, in some embodiments, is similar to that discussed above in connection with FIGS. 8 and 9. That is, in those embodiments, ImageNet 1135 or 1210 is similar in structure to the child network shown in FIG. 8, and the other child networks for other types of input data are similar in structure to that shown in FIG. 9, except that, in some cases, one input is fed to the child network instead of two.

As discussed above, in the embodiment shown in FIG. 4, the trajectory predictions for the ego vehicle and one or more road agents are cross-fed as inputs to each other's trajectory predictors, and the predicted trajectories of both the ego vehicle and the road agents and their respective associated confidence scores are iteratively updated. Those skilled in the art will recognize this kind of iterative trajectory prediction as an application of what is sometimes called a "Stackelberg game" or "Stackelberg contest." For example, in one embodiment, trajectory prediction system 170 arbitrarily begins by generating predicted trajectories for the ego vehicle (vehicle 100). Trajectory prediction system 170 then generates predicted trajectories for a given road agent with the predicted ego-vehicle trajectories and those of other road agents, if applicable, as inputs. Trajectory prediction system 170 then uses the predicted trajectories of the road agents as inputs to update the predicted ego-vehicle trajectories. Trajectory prediction system 170 then generates updated predicted trajectories for a given road agent with the updated ego-vehicle trajectories and the updated predicted trajectories of the other road agents as inputs.

This iterative "back and forth" process can be repeated multiple times. A small number of iterations is sometimes referred to as a "small-k" scenario, where k is the number of iterations. Similarly, a large number of iterations is sometimes referred to as a "long-k" scenario. In a long-k scenario, the trajectory predictions have a tendency to converge to relatively stable results. Those skilled in the art will recognize that the iterative process described above could just as easily begin with predicting the trajectory of one or more road agents instead of beginning with predicting the trajectory of the ego vehicle. Also, to initialize or bootstrap trajectory prediction system 170, some embodiments employ a Kalman filter or a particle filter until the DNN-based models described herein are ready to take over predicting trajectories and computing confidence scores.

In some embodiments, trajectory-prediction module 220 preserves the intermediate results of iterations throughout the iterative process (from small-k to long-k). As those skilled in the art are aware, the results of the trajectory-prediction iterations can be organized in a game tree, each layer or level of which corresponds to a particular iteration. The specific organization of the game tree depends on the order in which the ego-vehicle trajectory predictors consider the respective predicted road-agent trajectories. Different choices for sampling the probability distributions generated by variational trajectory predictors correspond to different paths that can be traversed through the game tree. For each possible ordering of road agents and for each possible path of traversal through the game tree due to sampling the trajectory distributions, the intermediate predictions during the iterative process are, in these embodiments, collected, aggregated, and output to control module 230. This permits trajectory prediction system 170 to be conservative in the sense that it considers all of the possible ways in which the road agents might act so the ego vehicle can plan and traverse a safe trajectory.

In some embodiments, during the iterative process, a given sampled predicted trajectory can have a weight associated with it in the game tree. The weights can relate to how likely the predicted trajectories in a particular iteration are to occur.

As discussed above, the ego-vehicle trajectory predictors can process the predicted road-agent trajectories in any of a variety of possible orderings. In one embodiment, the road-agent trajectory predictions are prioritized by their distance from the ego vehicle, those closer to the ego vehicle receiving a higher priority than those farther away. In another embodiment, the road-agent trajectory predictions are prioritized by the uncertainty associated with the road-agent trajectory predictions, those with less uncertainty (i.e., greater certainty) receiving a higher priority than those with greater uncertainty (i.e., lower certainty).

In some embodiments that include confidence scores, the confidence scores 560 and/or 1060 are computed based, at least in part, on the number of iterations that occur between the prediction of ego-vehicle trajectories and the prediction of road-agent trajectories while the predicted ego-vehicle and road-agent trajectories are being iteratively updated. In general, a greater number of iterations (long-k case) corresponds to a higher level of confidence in the resulting predicted trajectories because the predicted trajectories tend to converge to more stable predictions after sufficient iterations, as mentioned above.

Referring again to FIG. 2, trajectory prediction system 170 also includes control module 230. Control module 230, in general, includes instructions that cause the one or more processors 110 to control the operation of the ego vehicle (vehicle 100) based, at least in part, on at least one of (1) the iteratively updated predicted trajectories of the ego vehicle 465; and (2) the iteratively updated predicted trajectories of one or more external road agents (450, 455, 460). In some embodiments, confidence scores for the ego-vehicle and/or road-agent trajectory predictions can also be output to control module 230. In various embodiments, trajectory prediction system 170 can control the operation of vehicle 100 (the ego vehicle) by planning a trajectory for the ego vehicle based, at least in part, on some or all of the kinds of trajectory-prediction information discussed herein (specific predicted trajectories sampled from probability distributions, parameters defining trajectory probability distributions, and confidence scores associated with predicted trajectories). In some embodiments, the planned trajectory is executed by the ego vehicle entirely autonomously via autonomous driving module(s) 160, when the vehicle is operating in a fully autonomous driving mode. In other embodiments, the planned trajectory is executed by the system temporarily taking at least partial control, from a human driver, of certain vehicle functions such as steering and/or braking, if the system deems such intervention to be necessary to ensure that the vehicle traverses a safe trajectory (e.g., avoids collisions with road agents or other objects in the environment).

Referring again to FIG. 2, trajectory prediction system 170 also includes model-training module 240, which causes the one or more processors 110 to perform functions pertaining to the training of the DNNs employed in the trajectory-prediction and confidence-estimation models of some of the embodiments discussed herein. For example, in one embodiment, model-training module 240 trains, respectively, variational trajectory predictor 520, confidence estimator 530, variational trajectory predictor 1020, and confidence estimator 1030. In some embodiments, the DNNs in the variational trajectory predictors are trained with different loss functions and regularization terms than those used in training the confidence estimators, as explained further below. In one particular embodiment, the statistical computational models are implemented using PyTorch and trained on an AWS server with four Tesla V100 graphics processing units (GPUs) operating in parallel.

In some embodiments, variational trajectory predictor 520 or 1020 is trained as in variational inference, with the loss function defined to be the negative log-likelihood of the ground-truth trajectory coefficients given the GMM parameters 550 or 1050 output by the model, in addition to several regularization terms. As those skilled in the art are aware, "regularization terms" are those not dependent on data that give guidance or direction to the choice of parameters the neural network is outputting.

The log probability for a single Gaussian component with basis dimensionality D is computed as follows:

$$LP_i(c) = \sum_{d=1}^{D} -\log(2\pi\sigma_d^2) - \frac{(c_d - \mu_d)^2}{\sigma_d^2},$$

where the $c_d$ are the individual projection coefficients of the applicable trajectory. The mathematical symbols of the GMM parameters 550 were identified above.

The negative log-likelihood for all mixture components is computed as follows:

$$\ell_{NLL}(c) = -\log \sum_i w_i \exp LP_i(c).$$

In some embodiments, to ensure the output weights and variance values are reasonable, the following loss functions can be used: an L2 loss on weight summation, an $L_{0.5}$ norm loss (sum of square roots) on individual weights, and an L2 loss on standard deviations. The total loss is a summation of individual losses, as described above.

In some embodiments, in training the confidence estimator 530 or 1030, the loss function is defined as the L2 error between the predicted confidence scores computed using the coefficients output by the model and the actual confidence scores (i.e., confidence scores determined relative to the actual trajectory taken by the vehicle in the training data). In some embodiments, the error is computed with respect to the average predicted direction of travel. In other embodiments, the average error is computed over a set of samples. For example, in one embodiment, confidence estimator 530 or 1030 samples from the distribution, computes the error between that and the path the vehicle actually took in the training data, and averages the error over a set of samples. In general, the confidence score can be represented by any loss metric well-defined over the variational predictor and the expert predictor(s). One illustrative choice is displacement error at the end (limit) of the predictive temporal horizon (e.g., the difference between an actual trajectory at the end of the predictive temporal horizon and the predicted trajectory at the end of the predictive temporal horizon). Another illustrative choice is root-mean-squared-error (RMSE) along the entire trajectory. Both of these metrics are used, in some embodiments.

Figure 13:
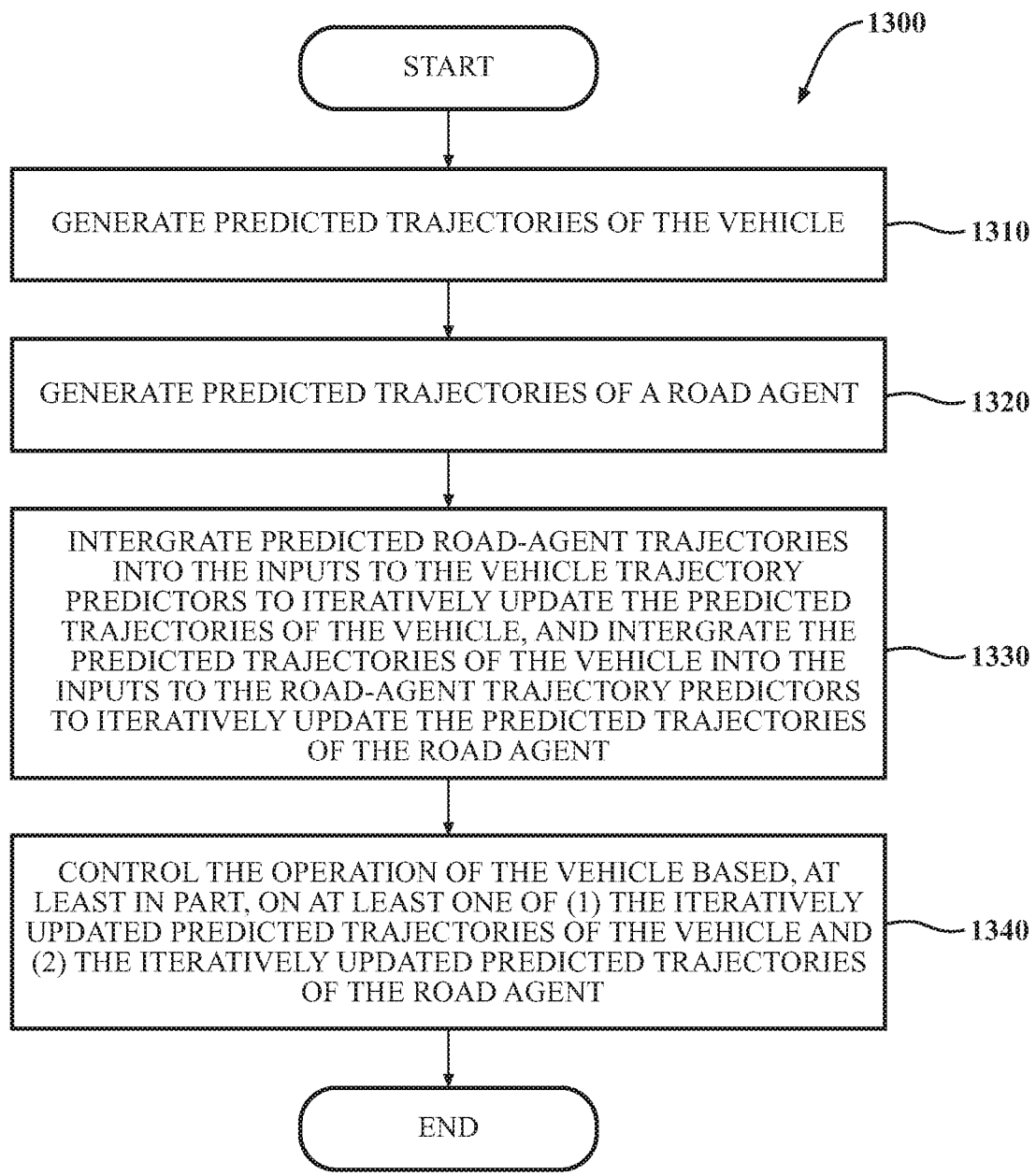
FIG. 13 is a flowchart of a method of controlling the operation of a vehicle, in accordance with an illustrative embodiment of the invention.

FIG. 13 is a flowchart of a method 1300 of controlling the operation of a vehicle 100, in accordance with an illustrative embodiment of the invention. Method 1300 will be discussed from the perspective of trajectory prediction system 170 in FIG. 2. While method 1300 is discussed in combination with trajectory prediction system 170, it should be appreciated that method 1300 is not limited to being implemented within trajectory prediction system 170, but trajectory prediction system 170 is instead one example of a system that may implement method 1300.

At block 1310, ego-vehicle trajectory prediction subsystem 405, part of trajectory-prediction module 220, generates predicted trajectories 465 for the ego vehicle (vehicle 100). As explained above, ego-vehicle trajectory prediction subsystem 405 generates the predicted ego-vehicle trajectories based, at least in part, on inputs that include at least past trajectory information for the ego vehicle and sensor data. The sensor data can include one or more of image, LIDAR, radar, sonar, CAN bus, and IMU data, depending on the embodiment.

At block 1320, road-agent trajectory prediction subsystem 415, also part of trajectory-prediction module 220, generates predicted trajectories 450 for a road agent (e.g., the road agent identified as "Road Agent 1" in FIG. 4) external to vehicle 100. As explained above, road-agent trajectory prediction subsystem 415 generates the predicted road-agent trajectories based, at least in part, on inputs that include at least past trajectory information for the road agent and sensor data. The sensor data can include one or more of image, LIDAR, radar, sonar, and structured (higher-level) data, depending on the embodiment. As discussed above, the sensor data can originate from sensor system 120 and/or vehicle systems 140 of vehicle 100, or it can originate from an external road agent and be received by vehicle 100 from the external road agent via V2V communication.

At block 1330, trajectory-prediction module 220 (1) integrates the predicted road-agent trajectories 450 into the inputs 510 of ego-vehicle trajectory prediction subsystem 405 to iteratively update the predicted ego-vehicle trajectories 465 and (2) integrates the predicted ego-vehicle trajectories 465 into the inputs 1010 of road-agent trajectory prediction subsystem 415 to iteratively update the predicted road-agent trajectories 450. As discussed above, in some embodiments, the iterative process can be repeated for multiple cycles, depending on the embodiment.

As also discussed above, in some embodiments, trajectory-prediction module 220 substitutes, for the predicted ego-vehicle trajectories 465, a deterministic ego-vehicle trajectory 470 as an input to the respective road-agent trajectory prediction subsystems (415, 420, 425) to iteratively update the predicted road-agent trajectories (450, 455, 460), when the vehicle 100 is operating in an autonomous driving mode. This simplifies predicting the road-agent trajectories, in such a scenario.

At block 1340, control module 230 controls the operation of the ego vehicle (vehicle 100) based, at least in part, on at least one of (1) the iteratively updated predicted trajectories 465 of vehicle 100; and (2) the iteratively updated predicted trajectories 450 of the external road agent. As discussed above, in some embodiments, confidence scores are generated for the respective ego-vehicle and/or road-agent predicted trajectories. As also discussed above, in some embodiments, control module 230 can control the operation of vehicle 100 (the ego vehicle) by planning a trajectory for the ego vehicle based, at least in part, on some or all of the kinds of trajectory-prediction information discussed herein (specific predicted trajectories sampled from probability distributions, parameters defining trajectory probability distributions, and confidence scores associated with predicted trajectories). As also discussed above, in some embodiments, the planned trajectory is executed by the ego vehicle entirely autonomously via autonomous driving module(s) 160, when the vehicle is operating in a fully autonomous driving mode. In other embodiments, the planned trajectory is executed by the system temporarily taking at least partial control, from a human driver, of certain vehicle functions such as steering and/or braking, if the system deems such intervention to be necessary to ensure that the vehicle traverses a safe trajectory (e.g., avoids collisions with road agents or other objects in the environment).

Though method 1300 was described above in terms of a single road agent whose trajectory is predicted by road-agent trajectory prediction subsystem 415, in other embodiments, method 1300 can be generalized to the case of K road agents (refer to elements 415, 420, and 425 in FIG. 4). In such embodiments, the predicted trajectories (450, 455, 460) of the K road agents are fed as inputs to ego-vehicle trajectory prediction subsystem 405, and the road-agent trajectory prediction subsystem for each road agent (415, 420, or 425) receives, as input, the predicted trajectories of the other K−1 road agents, in addition to the predicted ego-vehicle trajectories 465, as discussed above in connection with FIGS. 11 and 12. This permits the iterative updating of predicted ego-vehicle trajectories 465 based, at least in part, on the predicted trajectories of the K road agents while simultaneously permitting the iterative updating of the predicted trajectories for a given road agent (450, 455, or 460) based, at least in part, on the predicted ego-vehicle trajectories 465 and the predicted trajectories of the other K−1 road agents.

Stated in other words, in some embodiments, trajectory-prediction module 220 integrates, into the inputs to ego-vehicle trajectory prediction subsystem 405, the predicted trajectories of at least one other road agent external to vehicle 100 (i.e., in addition to the external road agent discussed above in connection with FIG. 13) to iteratively update the predicted trajectories of the ego vehicle. In those embodiments, trajectory-prediction module 220 also integrates, into the inputs to the road-agent trajectory prediction subsystem for a given road agent (e.g., element 415 in FIG. 4) the predicted trajectories of at least one other road agent external to the vehicle 100 to iteratively update the predicted trajectories of the given road agent.

FIG. 14 is a flowchart of a method of training the DNNs in one or more variational trajectory predictors and confidence estimators, in accordance with an illustrative embodiment of the invention. Method 1400 will be discussed from the perspective of trajectory prediction system 170 in FIG. 2. While method 1400 is discussed in combination with trajectory prediction system 170, it should be appreciated that method 1400 is not limited to being implemented within trajectory prediction system 170, but trajectory prediction system 170 is instead one example of a system that may implement method 1400.

At block 1410, model-training module 240 trains one or more DNNs present in ego-vehicle trajectory prediction subsystem 405 and/or one or more road-agent trajectory prediction subsystems (e.g., 415, 420, and 425 in FIG. 4) in accordance with the techniques discussed above. As discussed above, in one embodiment, model-training module 240 trains, respectively, variational trajectory predictor 520, confidence estimator 530, variational trajectory predictor 1020, and confidence estimator 1030. In some embodiments, the DNNs in the variational trajectory predictors are trained with different loss functions and regularization terms than those used in training the confidence estimators, as discussed above.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trajectory prediction system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the trajectory prediction system 170, and/or the autonomous driving module(s) 160 may control some or all of these vehicle systems 140 and, thus, may be partially or fully autonomous.

The processor(s) 110, the trajectory prediction system 170, and/or the autonomous driving module(s) 160 can be operably connected to communicate with the various vehicle systems 140 and/or individual components thereof. For example, returning to FIG. 1, the processor(s) 110, the trajectory prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the trajectory prediction system 170, and/or the autonomous driving module(s) 160 may control some or all of these vehicle systems 140.

The processor(s) 110, the trajectory prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the trajectory prediction system 170, and/or the autonomous driving module(s) 160 can control the direction and/or speed of the vehicle 100. The processor(s) 110, the trajectory prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trajectory prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-14, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for controlling operation of a vehicle, the system comprising:
   one or more processors; and
   a memory communicably coupled to the one or more processors and storing:
   a trajectory-prediction module including instructions that when executed by the one or more processors cause the one or more processors to:
      generate predicted trajectories of the vehicle using first trajectory predictors based, at least in part, on first inputs including at least past trajectory information for the vehicle and sensor data, when the vehicle is operating in one of a manual driving mode and a semi-autonomous driving mode;
      generate predicted trajectories of a road agent that is external to the vehicle using second trajectory predictors based, at least in part, on second inputs including at least past trajectory information for the road agent and the sensor data; and
      integrate the predicted trajectories of the road agent into the first inputs to iteratively update the predicted trajectories of the vehicle and integrate the predicted trajectories of the vehicle into the second inputs to iteratively update the predicted trajectories of the road agent; and
   a control module including instructions that when executed by the one or more processors cause the one or more processors to control operation of the vehicle based, at least in part, on at least one of the iteratively updated predicted trajectories of the vehicle and the iteratively updated predicted trajectories of the road agent.

2. The system of claim 1, wherein the trajectory-prediction module includes further instructions to integrate predicted trajectories of at least one other road agent external to the vehicle into the first inputs to iteratively update the predicted trajectories of the vehicle and to integrate the predicted trajectories of the at least one other road agent into the second inputs to iteratively update the predicted trajectories of the road agent.

3. The system of claim 1, wherein the trajectory-prediction module includes further instructions to:

compute a first set of confidence scores for the respective predicted trajectories of the vehicle as a function of time within a first predetermined temporal horizon using a first confidence estimator that includes a first deep neural network and iteratively update the first set of confidence scores as the predicted trajectories of the vehicle are updated; and compute a second set of confidence scores for the respective predicted trajectories of the road agent as a function of time within a second predetermined temporal horizon using a second confidence estimator that includes a second deep neural network and iteratively update the second set of confidence scores as the predicted trajectories of the road agent are updated.

4. The system of claim 3, wherein one of the first trajectory predictors is a first probabilistic variational trajectory predictor that includes a third deep neural network and one of the second trajectory predictors is a second probabilistic variational trajectory predictor that includes a fourth deep neural network.

5. The system of claim 4, further comprising:
a model-training module including instructions that when executed by the one or more processors cause the one or more processors to train at least one of the first, second, third, and fourth deep neural networks.

6. The system of claim 3, wherein the trajectory-prediction module includes further instructions to compute the first and second sets of confidence scores based, at least in part, on a number of iterations that occur between the first and second trajectory predictors while the predicted trajectories of the vehicle and the predicted trajectories of the road agent are being iteratively updated.

7. The system of claim 1, wherein the trajectory-prediction module includes further instructions to substitute, for the predicted trajectories of the vehicle, in the second inputs a deterministic trajectory of the vehicle to iteratively update the predicted trajectories of the road agent, when the vehicle is operating in an autonomous driving mode.

8. The system of claim 1, wherein the control module includes instructions to control operation of the vehicle by planning a trajectory for the vehicle.

9. The system of claim 1, wherein the iteratively updated predicted trajectories of the vehicle and the iteratively updated predicted trajectories of the road agent include at least one of specific predicted trajectories sampled from respective first and second probability distributions and parameters defining the respective first and second probability distributions.

10. The system of claim 1, wherein the sensor data includes at least one of image data, Controller Area Network (CAN bus) data, Inertial Measurement Unit (IMU) data, light detection and ranging (LIDAR) data, radar data, and sonar data and the sensor data originates from at least one of the vehicle and the road agent.

11. A non-transitory computer-readable medium for controlling operation of a vehicle and storing instructions that when executed by one or more processors cause the one or more processors to:
generate predicted trajectories of the vehicle using first trajectory predictors based, at least in part, on first inputs including at least past trajectory information for the vehicle and sensor data when the vehicle is operating in one of a manual driving mode and a semi-autonomous driving mode;
generate predicted trajectories of a road agent that is external to the vehicle using second trajectory predictors based, at least in part, on second inputs including at least past trajectory information for the road agent and the sensor data;
integrate the predicted trajectories of the road agent into the first inputs to iteratively update the predicted trajectories of the vehicle and integrate the predicted trajectories of the vehicle into the second inputs to iteratively update the predicted trajectories of the road agent; and
control operation of the vehicle based, at least in part, on at least one of the iteratively updated predicted trajectories of the vehicle and the iteratively updated predicted trajectories of the road agent.

12. The non-transitory computer-readable medium of claim 11, wherein the instructions to integrate the predicted trajectories of the vehicle into the second inputs to iteratively update the predicted trajectories of the road agent include further instructions to substitute, for the predicted trajectories of the vehicle, in the second inputs a deterministic trajectory of the vehicle to iteratively update the predicted trajectories of the road agent, when the vehicle is operating in an autonomous driving mode.

13. A method of controlling a vehicle, the method comprising:
generating predicted trajectories of the vehicle using first trajectory predictors based, at least in part, on first inputs including at least past trajectory information for the vehicle and sensor data when the vehicle is operating in one of a manual driving mode and a semi-autonomous driving mode;
generating predicted trajectories of a road agent that is external to the vehicle using second trajectory predictors based, at least in part, on second inputs including at least past trajectory information for the road agent and the sensor data;
integrating the predicted trajectories of the road agent into the first inputs to iteratively update the predicted trajectories of the vehicle and integrating the predicted trajectories of the vehicle into the second inputs to iteratively update the predicted trajectories of the road agent; and
automatically controlling operation of the vehicle based, at least in part, on at least one of the iteratively updated predicted trajectories of the vehicle and the iteratively updated predicted trajectories of the road agent.

14. The method of claim 13, further comprising:
integrating predicted trajectories of at least one other road agent external to the vehicle into the first inputs to iteratively update the predicted trajectories of the vehicle; and
integrating the predicted trajectories of the at least one other road agent into the second inputs to iteratively update the predicted trajectories of the road agent.

15. The method of claim 13, further comprising:
computing a first set of confidence scores for the respective predicted trajectories of the vehicle as a function of time within a first predetermined temporal horizon using a first confidence estimator that includes a first deep neural network and iteratively updating the first set of confidence scores as the predicted trajectories of the vehicle are updated; and
computing a second set of confidence scores for the respective predicted trajectories of the road agent as a function of time within a second predetermined temporal horizon using a second confidence estimator that includes a second deep neural network and iteratively updating the second set of confidence scores as the predicted trajectories of the road agent are updated.

16. The method of claim 15, wherein one of the first trajectory predictors is a first probabilistic variational trajectory predictor that includes a third deep neural network and one of the second trajectory predictors is a second probabilistic variational trajectory predictor that includes a fourth deep neural network.

17. The method of claim 16, further comprising:
training at least one of the first, second, third, and fourth deep neural networks.

18. The method of claim 15, wherein computing the first and second sets of confidence scores is based, at least in part, on a number of iterations that occur between the first and second trajectory predictors while the predicted trajectories of the vehicle and the predicted trajectories of the road agent are being iteratively updated.

19. The method of claim 13, further comprising:
substituting, for the predicted trajectories of the vehicle, in the second inputs a deterministic trajectory of the vehicle to iteratively update the predicted trajectories of the road agent, when the vehicle is operating in an autonomous driving mode.

20. The method of claim 13, wherein controlling operation of the vehicle includes planning a trajectory for the vehicle.

* * * * *